US011928284B2

(12) United States Patent
Grygorenko et al.

(10) Patent No.: US 11,928,284 B2
(45) Date of Patent: Mar. 12, 2024

(54) SYSTEMS, METHODS, AND DEVICES FOR DEFECT DETECTION IN CAPACITIVE TOUCH PANELS

(71) Applicant: Cypress Semiconductor Corporation, San Jose, CA (US)

(72) Inventors: Vadym Grygorenko, Lviv (UA); Viktor Kremin, Lviv (UA); Oleksii Bukhtii, Lviv (UA); Oleksandr Pirogov, Lviv (UA); Jens Weber, Pinneberg (DE); Taras Kuzo, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/654,385

(22) Filed: Mar. 10, 2022

(65) Prior Publication Data

US 2023/0289012 A1  Sep. 14, 2023

(51) Int. Cl.
*G06F 3/041* (2006.01)
*G06F 3/044* (2006.01)
*G01D 5/24* (2006.01)
*G01D 18/00* (2006.01)

(52) U.S. Cl.
CPC ........ *G06F 3/0418* (2013.01); *G06F 3/04166* (2019.05); *G06F 3/0446* (2019.05); *G01D 5/24* (2013.01); *G01D 18/00* (2013.01)

(58) Field of Classification Search
CPC ...... G06F 3/0418; G06F 3/0446; G06F 3/044; G06F 3/04166; G06F 3/0412; G06F 3/0416; G01D 5/24; G01D 18/00
See application file for complete search history.

(56) References Cited

U.S. PATENT DOCUMENTS

| | | | |
|---|---|---|---|
| 8,519,722 B1* | 8/2013 | Prendergast | G06F 3/0443 |
| | | | 345/173 |
| 8,773,386 B2* | 7/2014 | Wilson | G06F 3/041 |
| | | | 345/173 |
| 9,689,825 B1* | 6/2017 | Lim | G01N 27/24 |
| 9,733,293 B1* | 8/2017 | Shen | G06F 3/0445 |
| 11,221,715 B2* | 1/2022 | Nam | G06F 3/0447 |
| 2011/0050617 A1* | 3/2011 | Murphy | G06F 11/2221 |
| | | | 345/174 |
| 2014/0085241 A1* | 3/2014 | Christiansson | G06F 3/0421 |
| | | | 345/173 |
| 2019/0324584 A1* | 10/2019 | Son | G06F 3/0443 |
| 2021/0278967 A1* | 9/2021 | Rosenberg | G06F 3/0443 |
| 2023/0161433 A1* | 5/2023 | Nakajima | G06F 3/0416 |
| | | | 345/174 |

* cited by examiner

*Primary Examiner* — Darlene M Ritchie

(57) ABSTRACT

Systems, methods, and devices detect defects in touch panels. Methods include scanning, using a designated integration window, a plurality of electrodes of a sensing device to obtain a plurality of measurements and determining a plurality of variance values for the plurality of electrodes based on the plurality of measurements, the plurality of variance values identifying variances in the plurality of measurements between adjacent sense locations of the sensing device. Methods also include determining if a defect is present in the sensing device based, at least in part, on a comparison of the plurality of difference values with the plurality of threshold values.

17 Claims, 15 Drawing Sheets

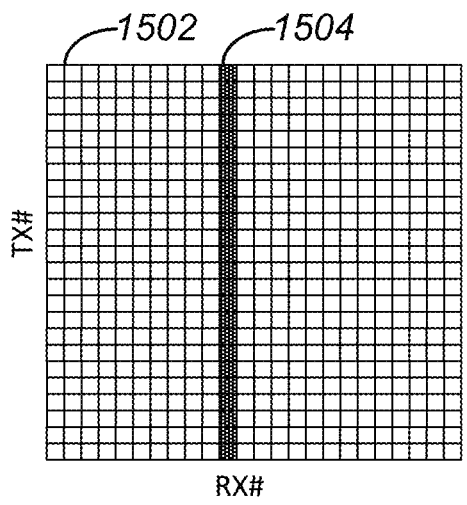
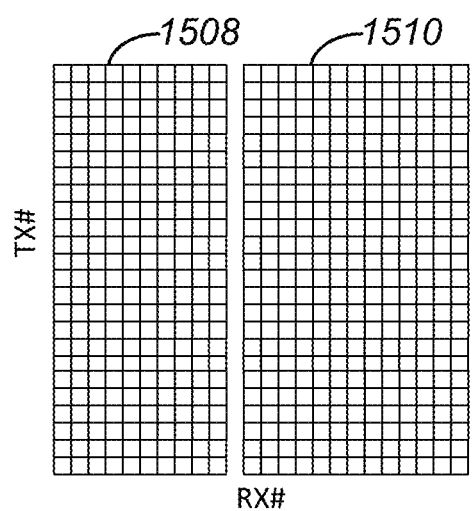
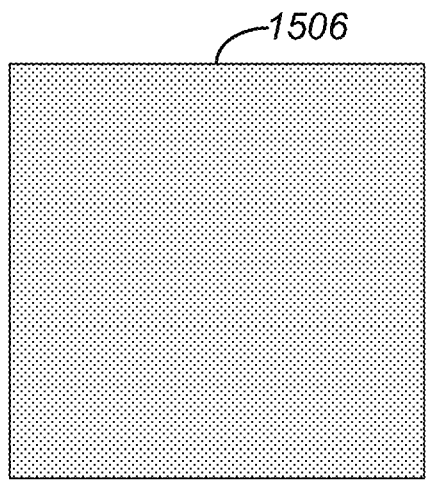
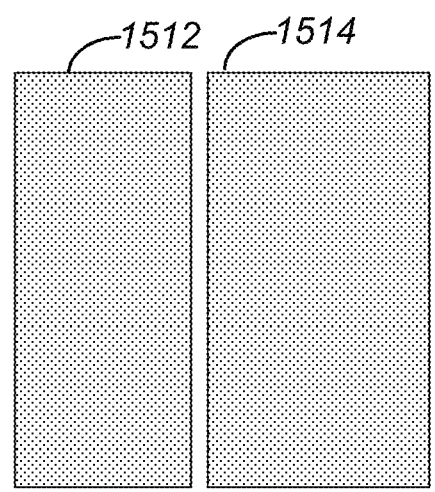
FIG. 15A
FIG. 15B

SYSTEMS, METHODS, AND DEVICES FOR DEFECT DETECTION IN CAPACITIVE TOUCH PANELS

TECHNICAL FIELD

This disclosure generally relates to touch panels, and more specifically, to detecting defects within such touch panels.

BACKGROUND

Sensing devices may be used to detect user inputs. For example, sensing devices may be configured to identify user touches and hovers. Accordingly, one or more sensing modalities may be implemented to detect such inputs. In one example, capacitive sensing may be used to identify such touches and hovers based on capacitive measurements obtained from a sensing device. Such capacitive sensing devices may include arrays of electrodes that may be driven with signals to obtain measurements and detect user inputs. However, conventional sensing devices remain limited because they are susceptible to damage of electrodes, and are limited in their ability to function despite such damage.

BRIEF DESCRIPTION OF THE DRAWINGS

FIG. 15A illustrates an example of a sensing device, configured in accordance with some embodiments.

FIG. 15B illustrates an example of another sensing device, configured in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Sensing devices may include various arrays of electrodes. For example, transmit electrodes may be driven with a signal that may be received by receive electrodes. One or more measurements may be made in response to the application of such a signal. For example, mutual capacitance measurements may be made and stored as measurement data. As will be discussed in greater detail below, one or more electrodes included in sensing devices may become damaged over time due to, among other things, physical deformation and bending that occurs during a user touch. Accordingly, conductive properties of the electrodes may change due to defects and/or damage, and such changed conductive properties may affect capacitive measurements. Accordingly, conventional sensing devices remain limited because damaged electrodes may result in erroneous readings and false touch detections, and conventional sensing devices are not able to efficiently and effectively mitigate the effects of such damaged electrodes.

Embodiments disclosed herein provide sensing devices with the ability to detect defects and mitigate the effects of such defects. As will be discussed in greater detail below, variable time receive electrode sensing current integration windows used for measurements may be configured to facilitate distinction between normal electrodes and defective electrodes. More specifically, computations, such as difference value computations, may be performed and results may be compared against threshold values. One or more defects may be detected based on the comparison, and one or more corrective operations may be performed to mitigate and reduce an effect of the defect. In this way, deleterious effects of defects, such as defective or damaged electrodes, may be reduced, and safe operation of a sensing device that includes the electrodes may be prolonged.

Figure 1:
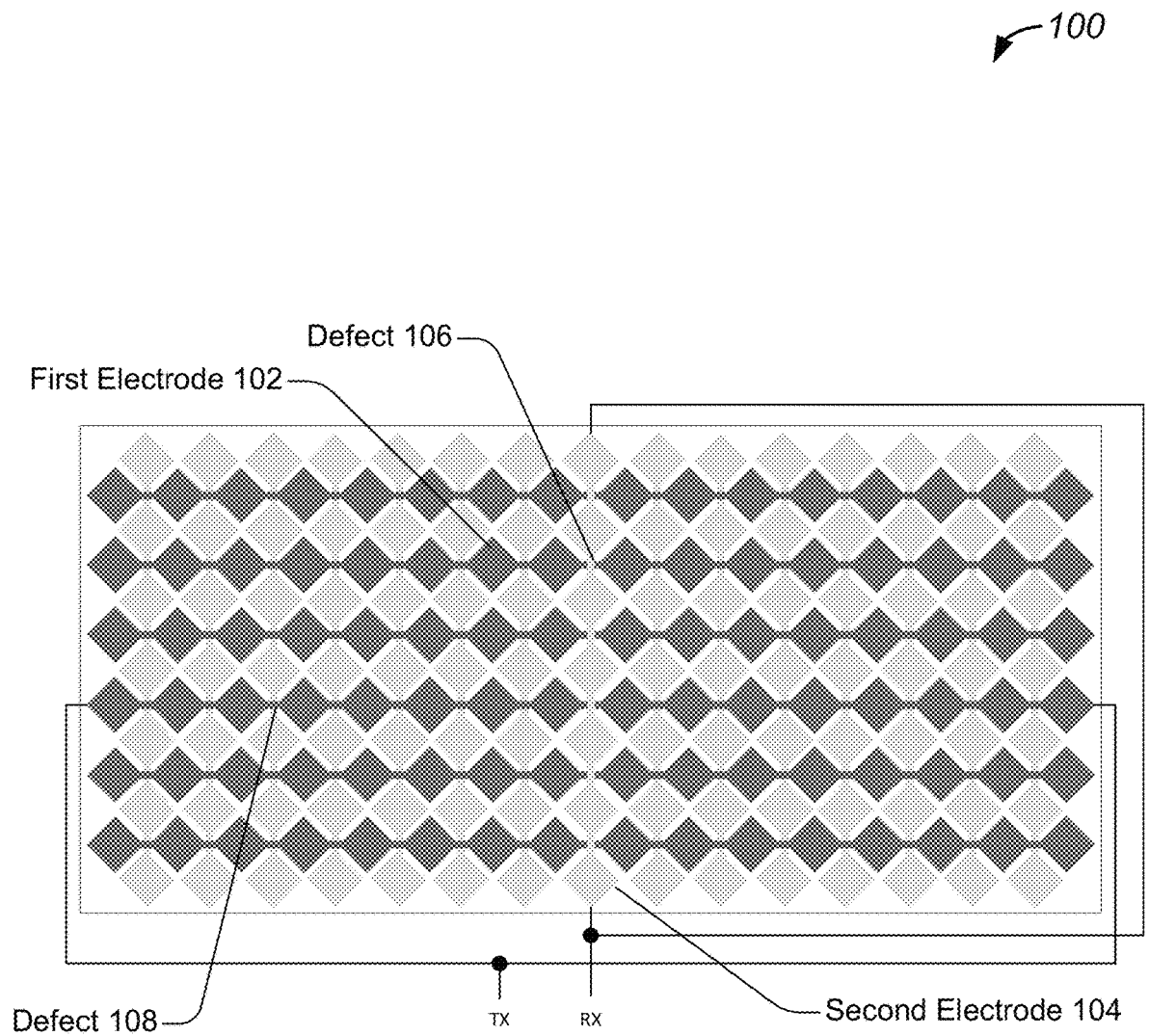
FIG. 1 illustrates an example of a device for defect detection, configured in accordance with some embodiments.

FIG. 1 illustrates an example of a device for defect detection, configured in accordance with some embodiments. As shown in FIG. 1, a sensing device may include various electrodes configured to obtain one or more measurements for touch and/or hover detection. Accordingly, a sensing device, such as device 100, may include one or more rows and columns of electrodes configured to make measurements, such as capacitance measurements, for detection operations. As will be discussed in greater detail below, one or more defects may be present in electrodes of device 100. Accordingly, embodiments disclosed herein may be configured to detect such defects, and perform one or more mitigation operations to mitigate the effects of such defects, and prolong the life and operation of device 100.

In various embodiments, device 100 includes a plurality of first electrodes and a plurality of second electrodes. For example, the first electrodes, which may be row electrodes, may be configured to be driven by a signal, and the second electrodes may be configured to obtain one or more measurements in response to the application of the signal to the first electrodes. It will be appreciated that column electrodes may be driven by the signal and row electrodes may be used to obtain measurements. In this way, one or more measurements, such as an impedance measurement and a mutual capacitance measurement, may be obtained based on the application of such a signal. Additional details regarding the generation and application of such signals is discussed in greater detail below.

In some embodiments, the first electrodes include first electrode 102, and the second electrodes include second electrode 104, which may be a column electrode. As shown in FIG. 1, the electrodes may develop damage or defects over time that may affect performance of the electrodes. For example, damage to the electrodes may affect their conductance by reducing their conductivity and ability to obtain accurate measurements. Such damage and defects may be stress fractures, micro-scratches, or any other type of damage or defect. In various embodiments, electrodes may be made from a material such as indium tin oxide (ITO). Over time defects may manifest in the electrodes based on mechanical stresses endured by the electrodes from, for example, bending or application of pressure to device 100 which may be included in a touch panel. Defects may also arise from one or more aspects of a manufacturing process. Accordingly, as shown in FIG. 1, first electrode 102 may have defect 106 that may affect a received signal. Moreover, additional defects, such as defect 108, may also be present that affect a transmitted signal. As will be discussed in greater detail below, additional components coupled to device 100 may be configured to detect defect 106, and to perform various mitigation operations to compensate for the effects of defect 106 in touch/hover detection operations.

Figure 2:
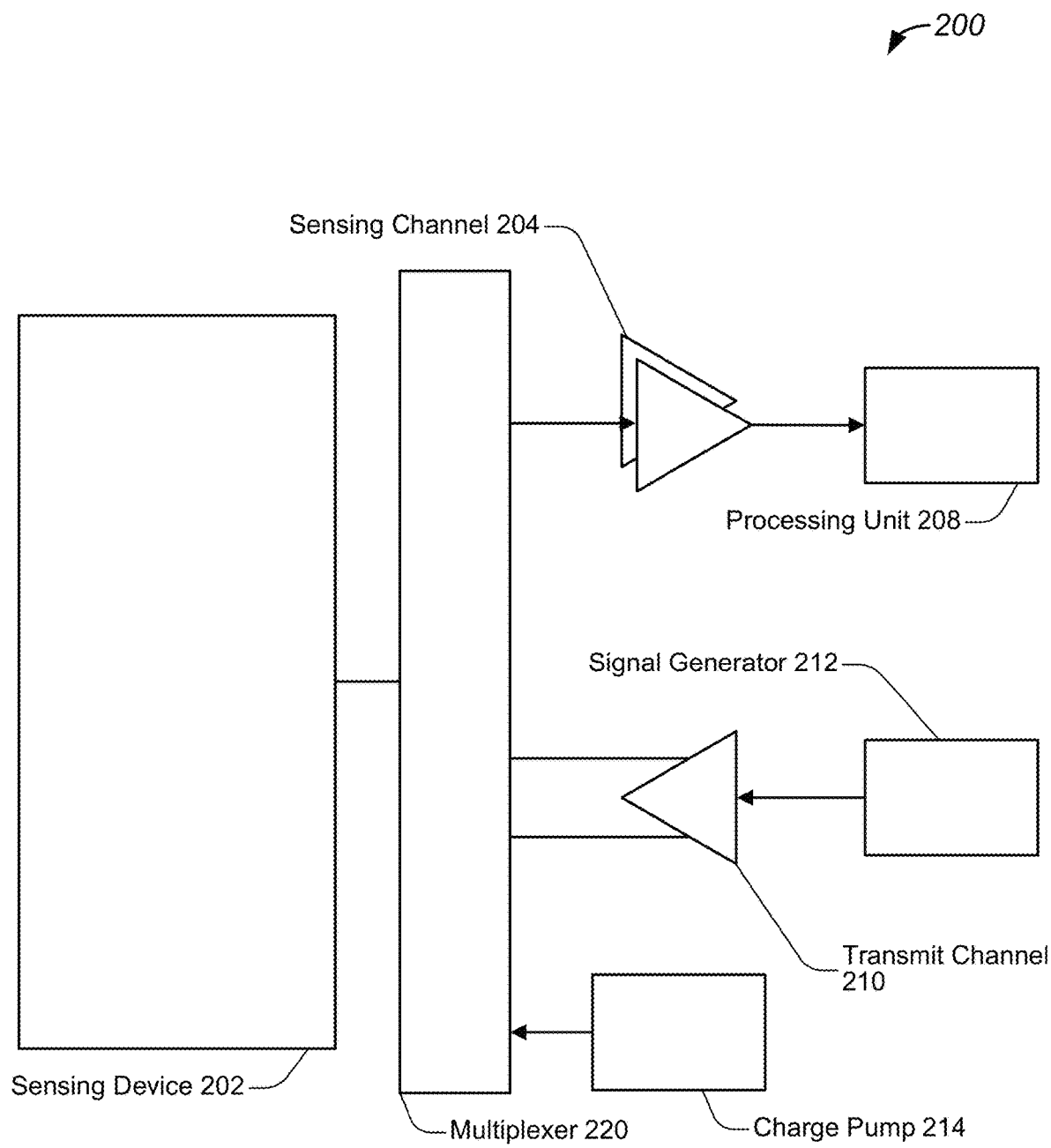
FIG. 2 illustrates an example of a system for defect detection, configured in accordance with some embodiments.

FIG. 2 illustrates an example of a system for defect detection, configured in accordance with some embodiments. As discussed above, systems disclosed herein are configured to obtain impedance and capacitance measurements, and identify hover and touch events based on such measurements, as may occur when a user hovers or touches a sensing device. Accordingly, a system, such as system 200 may include such a sensing device as may be implemented in the context of a capacitive sensor.

Accordingly, system 200 includes sensing device 202 which may be a touch panel that includes components, such as electrodes configured to sense changes in measured electrical properties within a designated distance of the sensing device. As discussed above, sensing device may be a touch screen, touch panel, fingerprint sensor, or button that includes one or more electrodes. In one example, the electrodes may be arranged in arrays of transmit and receive electrodes, where the transmit electrodes are configured to transmit a signal in accordance with a scanning protocol or sequence, and the receive electrodes are configured to receive the signal, thus obtaining sensed measurements of a capacitance and/or impedance between the two.

System 200 additionally includes one or more sensing channel 204 which is configured to receive the signal sensed by sensing device 202, as may be generated by receive electrodes included in sensing device. In various embodiments, sensing channel 204 includes various components, such as an attenuator and integration capacitors. In various embodiments, sensing channel 204 is configured to perform one or more charge-to-code conversion operations, thus enabling additional computations to be done in a digital format later. In various embodiments, the output data from sensing channel 204 is raw data. As shown in FIG. 2, sensing channel 204 may also be coupled to components, such as processing unit 208, also referred to herein as a processing device. Processing unit 208 is configured to perform various computations, such as raw data multi-phase deconvolution, filtering and noise removal, baseline calculation and subtraction, touch and hover object position calculation, finger identifier calculation, panel defect detection and mitigation action execution. In various embodiments, processing unit 208 may be configured to include a controller, as well as one or more processors or hardware accelerators configured to implement processing operations as well as mitigation operations. For example, processing unit 208 may be configured to identify and store measurement data in a memory device, as well as perform one of more computations to identify particular events, such as hover events and touch events. Moreover, processing unit 208 may also be configured to perform defect detection operations and mitigation operations, as will be discussed in greater detail below. While processing unit 208 has been shown as coupled to sensing channel 204.

System 200 further includes transmit channel 210 which is configured to generate a one or more signals provided to sensing device 202 that provides the signal used during a scanning sequence, and forms the basis of subsequent measurements. Accordingly, transmit channel 210 may include various components such as the one or more amplifiers and/or a buffer as well as a current source and/or a voltage source. As shown in FIG. 2, transmit channel 210 may be coupled to signal generator 212 as well as charge pump 214. Accordingly, signal generator 212 may be configured to generate a signal used to drive transmit electrodes during a scanning sequence, and thus may configure the parameters of such a drive signal. Charge pump 214 may be configured to provide voltage regulation for transmit channel 210. Moreover, multiplexer 220 may be configured to selectively couple sensing channels 204 and transmit channel 210 with particular electrodes of sensing device 202 in accordance with a scanning sequence. In various embodiments, sensing device 202 has larger number of receive electrodes than a number of parallel sensing channels 204, so scanning of the entirety of sensing device 202 is accomplished in more than one scanning slot. In some embodiments, multiplexer 220 may include a transmit multiplexer for transmit electrodes and a sensing multiplexer for sensing, also referred to herein as receive, electrodes. In various embodiments, multiplexer 220 may be implemented as a single multiplexer or as multiple multiplexers implemented separately or joined. In one example, there may be one or more transmit multiplexers for transmit channel 210 and there may be one or more receive multiplexers for receive channel 204.

Figure 3:
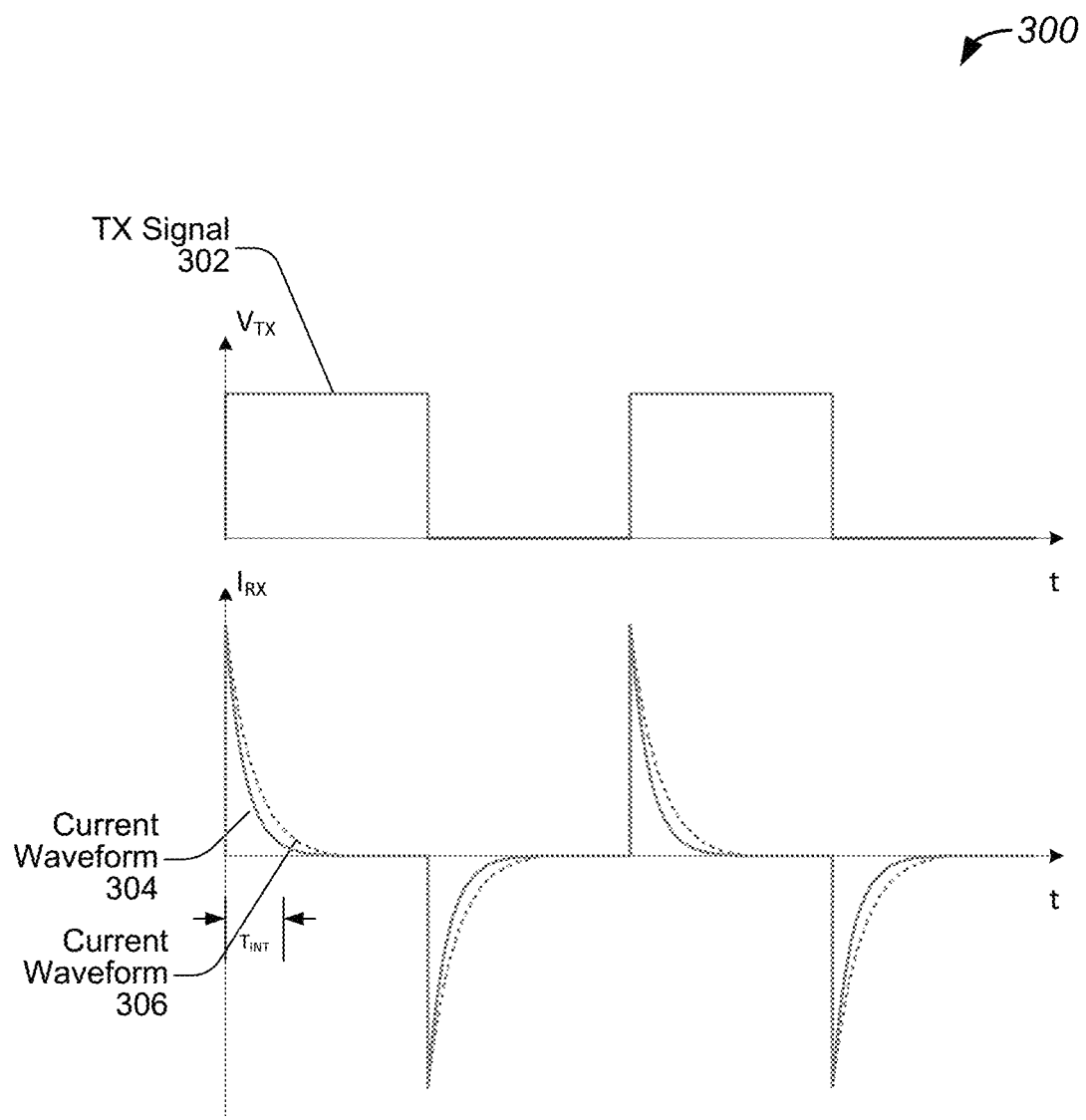
FIG. 3 illustrates an example of a diagram of touch panel currents, configured in accordance with some embodiments.

FIG. 3 illustrates an example of a diagram of touch panel waveforms, configured in accordance with some embodiments. As discussed above, electrodes may be included in a sensing device, and one or more signals may be used to drive first electrodes to obtain measurements on second electrodes. As shown in diagram 300, TX signal 302 may be used to apply a voltage to and drive first transmitting electrodes in a sensing device, as discussed above. The application of such a drive signal may induce a current in sensing device receive electrodes, Current waveform 304 shows the receive electrode current when there is no defect in the sensing device, which may be a panel. Current waveform 306 shows the same receive electrode current when there is a defect (e.g. micro-scratch) present in the sensing device.

In various embodiments, current waveform 304 represents a current in an electrode that does not have a defect. Moreover, current waveform 306 represents a current in the same electrode, but with the presence of a defect, such as a micro-scratch. Accordingly, as shown in diagram 300, the time course of the decay of the current is prolonged, and occurs over a longer period of time for damaged electrodes that have defects as defective sensing electrodes have larger time constants due to an increased receive electrode resistance caused by the defect. As will be discussed in greater detail below, such differences in time courses may be used to identify damaged electrodes as well as identify and perform mitigation operations.

Figure 4:
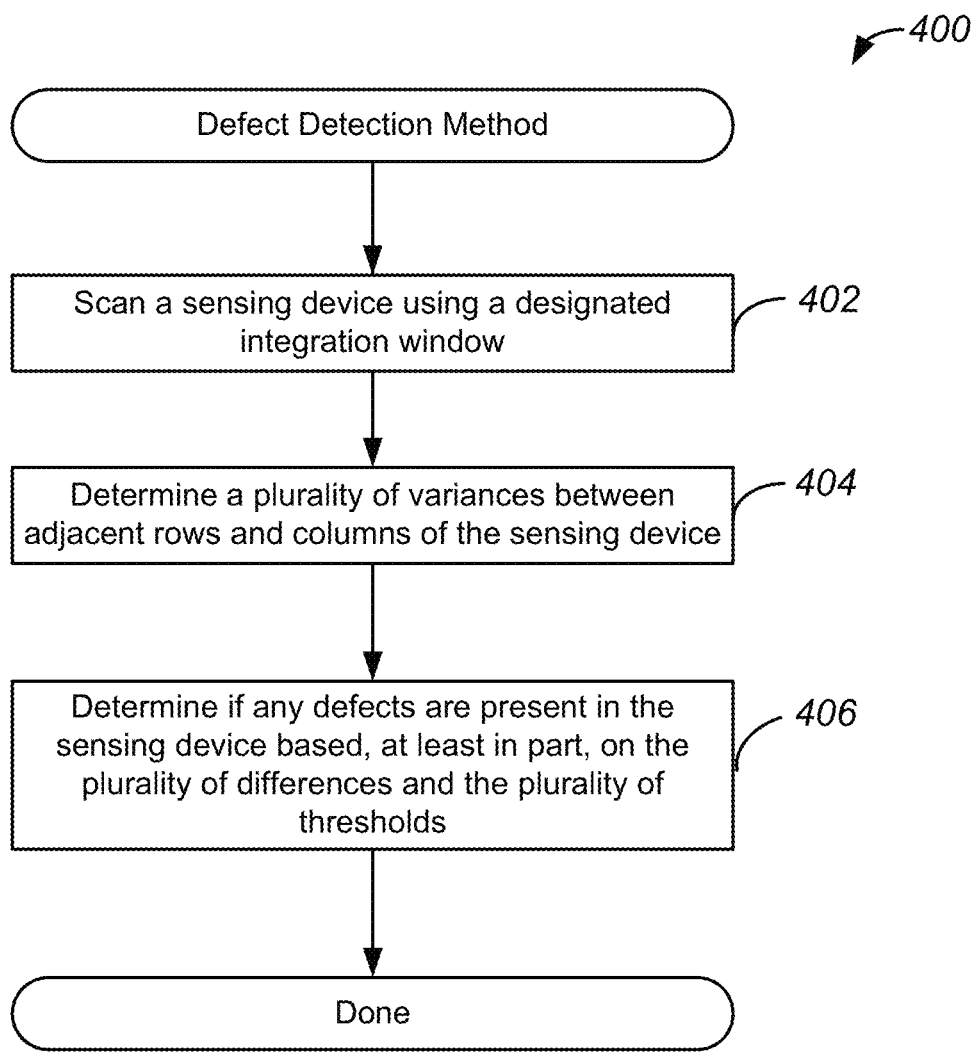
FIG. 4 illustrates an example of a method for defect detection, performed in accordance with some embodiments.

FIG. 4 illustrates an example of a method for defect detection, performed in accordance with some embodiments. As discussed above, a sensing device may include various electrodes configured to obtain one or more measurements for touch and/or hover detection. In various embodiments, a method, such as method 400, may be performed to identify defects in such a sensing device. Accordingly, methods disclosed herein may be performed to detect defects in a sensing device, and subsequent mitigation operations may be performed to mitigate such defects and prolong the operation of the sensing device.

Method 400 may perform operation 402 during which a sensing device may be scanned using a designated integration window. Accordingly, as similarly discussed above, rows and columns of electrodes may be sequentially scanned to obtain a plurality of measurements. In some embodiments, the rows and columns of electrodes may be scanned simultaneously using multi-phase transmit channels or by using multiple transmit/receive channels. Moreover, a designated integration window may be used for such scanning. In various embodiments, the designated integration window is a designated period of time over which measure charge is integrated. Accordingly, the designated integration window may be a measurement window.

Method 400 may perform operation 404 during which a plurality of variances between adjacent rows and columns may be determined. Accordingly, measurements between adjacent rows and adjacent columns may be compared to obtain a plurality of variance values representing variances between adjacent rows and differences between adjacent columns. As will be discussed in greater detail below, variance values may be difference values representing differences or may be data values generated based, at least in part, on an approximation function.

Method 400 may perform operation 406 during which it may be determined if any defects are present in the panel. Accordingly, during operation 406, the difference values may be compared with the plurality of thresholds to determine if any of the determined differences exceed a threshold value. If a difference value exceeds a threshold, a defect may be identified, and one or more mitigation operations may be performed, as will be discussed in greater detail below.

Figure 5:
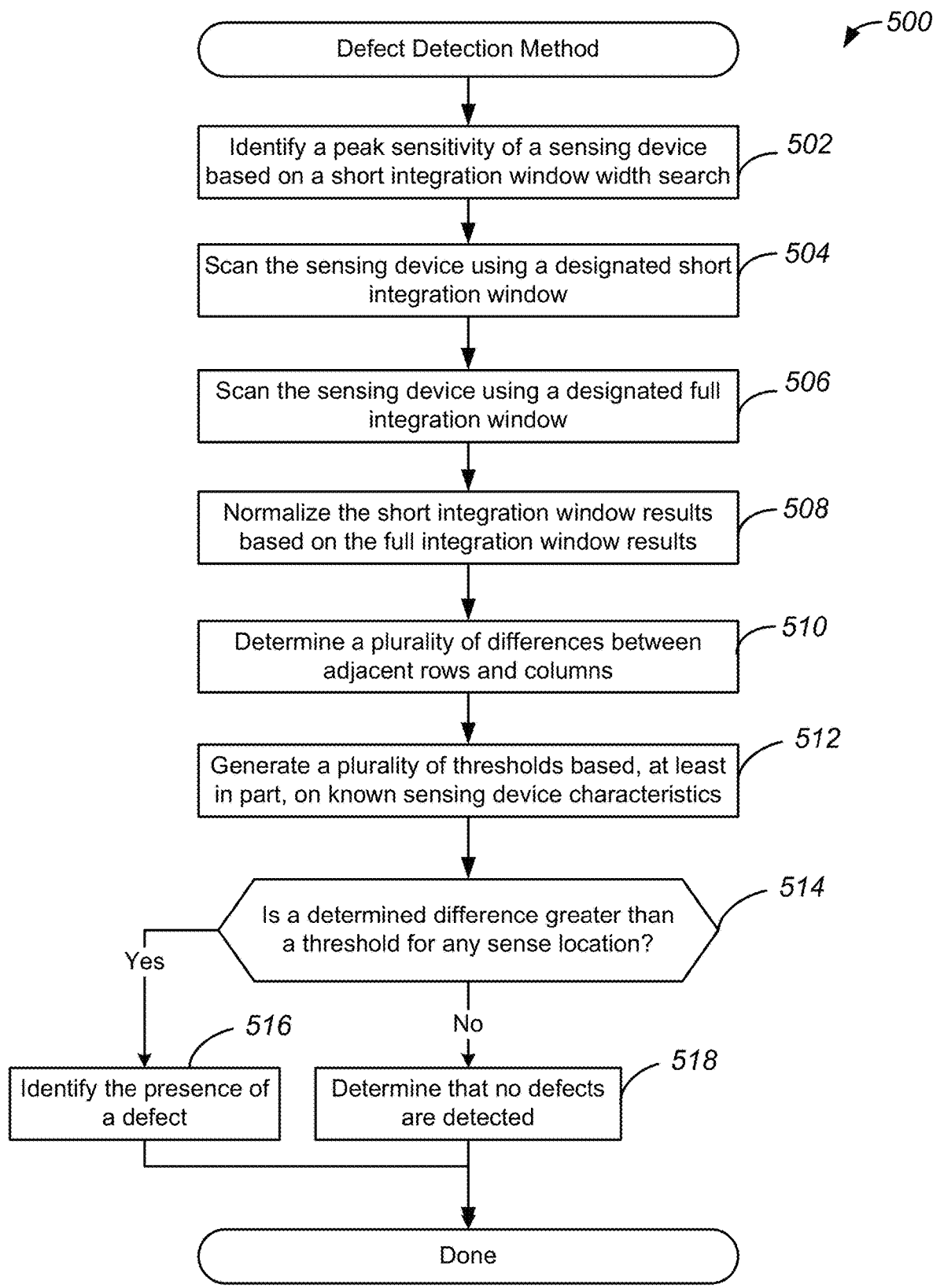
FIG. 5 illustrates an example of another method for defect detection, performed in accordance with some embodiments.

FIG. 5 illustrates an example of another method for defect detection, performed in accordance with some embodiments. As discussed above, a sensing device may include various electrodes configured to obtain one or more measurements for touch and/or hover detection. In various embodiments, a method, such as method 500, may be performed to identify defects in such a sensing device. As will be discussed in greater detail below, temporal responses of sensing locations may be used in combination with threshold values to facilitate detection and identification of sensing device defects.

Method 500 may perform operation 502 during which a peak sensitivity of a sensing device may be identified based on a short integration window width search. In various embodiments, a short integration window may be a designated period of time that is shorter than a total time for accumulated charge in the sensing device to discharge. More specifically, as similarly discussed above with reference to FIG. 3, a voltage may be applied to transmit electrodes, and accumulated charge and current may be measured at receive electrodes. The charge may decay over time as it discharges. The integration window, also described as $T_{INT}$, may be configured such that it covers an initial portion of the discharge thus enabling signal and defect detection, In various embodiments, the peak sensitivity may be identified based on an application of multiple different short integration window periods. Accordingly, operation 502 may be performed as part of a calibration operation, and test signals may be provided to and measured by electrodes included in the sensing device during calibration and initial configuration of a sensing device. The different short integration windows may be a designated set of windows having different lengths of time determined by an entity, such as a manufacturer. In various embodiments, the designated set of windows may have been determined based on simulation data or previous testing using a resistor in series with a sensing electrode to mimic or simulate a change in resistance caused by a defect such as a micro-scratch. For example, one or more calibration operations compare sensing channel readings with the calibration resistor coupled in series versus readings without the calibration resistor by, for example, bypassing it with a switch. The designated integration window may be identified when inclusion of the calibration resistor results in a largest relative change in the sensing channel raw data. For example, a percent change in measured mutual capacitance may be plotted against different integration windows, and an integration window at which a maximum percent difference occurs may be identified as the designated integration window. Accordingly, during operation 502, sensitivity readings may be obtained for the sensing device based on the different short integration windows, and a short integration window may be identified that provides a peak or greatest sensitivity.

Method 500 may perform operation 504 during which the sensing device may be scanned using the designated short integration window. Accordingly, scanning operations may be performed on the sensing device based on the short integration window, and measurements may be made and stored as measurement data. In various embodiments, the measurements include mutual capacitance measurements that measure a mutual capacitance between transmit and receive electrodes. As similarly discussed above, the measurements may also include impedance measurements.

Method 500 may perform operation 506 during which the sensing device may be scanned using a designated full integration window. In various embodiments, a full integration window may be a designated period of time that is longer than a total time for accumulated charge transfer in the sensing device to charge or discharge it almost completely. Accordingly, during the full integration window, a transient process of the sensing device must complete. Such a time period may be a designated time period determined by an entity, such as a manufacturer, as part of a simulation and/or manufacturing process. Accordingly, scanning operations may be performed on the sensing device based on the full integration window, and measurements may be made and stored as measurement data. As discussed above, the measurements include mutual capacitance measurements that measure a mutual capacitance between transmit and receive electrodes and/or may include impedance measurements.

Method 500 may perform operation 508 during which the short integration window results may be normalized based on the full integration window results. In various embodiments, the normalization may be performed by a cell-to-cell (or by other words, transmitter and receiver electrode cross-section) division of a measured mutual capacitance at the short integration window to a mutual capacitance at the full integration window. An equation that may be used for the normalization process is shown below in equation 1:

$$N_{i,j} = C_{i,j|TW\ SHORT} / C_{i,j|TW\ FULL} \quad (1)$$

As shown in equation 1, $C_{i,j|TW\ SHORT}$ and $C_{i,j|TW\ FULL}$ represent mutual capacitance of the i-column and j-row measured using short and full integration windows, respectively. Such normalization operations enable a reduction in sensitivity to cell-to-cell mutual capacitance variations, as may occur due to variances in a sensing device manufacturing processes. Accordingly, additional variance in measurement values may be reduced. In various embodiments, operations 506 and 508 are performed optionally. For example, in some embodiments, method 500 does not include operations 506 and 508. Accordingly, in various embodiments, no full integration window measurements are taken, and no normalization operations are performed.

Method 500 may perform operation 510 during which a plurality of differences between adjacent rows and columns of the sensing device may be determined. Accordingly, a plurality of difference values may be generated based on one or more distance computations relating to distances between sense cells on the sensing device. More specifically, measurements may have been stored in a table of data values, where each data value represents a measurement at an intersection between a row electrode and a column electrode in the sensing device. As will be discussed in greater detail below, such intersections may also be referred to as cells or sense cells. Moreover, differences may be computed based on difference computations. For example, a two-dimensional high pass filter (2D HPF) may be used to generate the difference values. In various embodiments, the 2D HPF identifies mutual capacitance change non-monotonies that may be caused by the panel defects. In one example, the 2D HPF is implemented by calculating the differences between entries in a mutual capacitance matrix row-to-row at a first step and column-to-column at a second step. Any suitable 2D HPF operation may be used.

Method 500 may perform operation 512 during which a plurality of thresholds may be generated based, at least in part, on known panel characteristics. In various embodiments, known mutual capacitance differences and known sensing device resistances may be stored in memory. Such known panel characteristics may have been determined by an entity, such as a manufacturer during a simulation and/or manufacturing process. For example, a simulation tool used during design of the sensing device may be used to determine the known mutual capacitance differences and known sensing device resistances, and such known panel characteristics may have been stored, by the manufacturer, in a memory device associated with the sensing device. As will be discussed in greater detail below, the known panel characteristics may be stored in a particular data structure configured to represent threshold values for each cell. In one example, the same threshold values can be selected for all electrode intersections. In another example, individual thresholds may be determined for each electrode intersection. The threshold value can be identified based on a PSPICE simulation of an effect of a micro-scratch on a mutual capacitance reading, an using an optimal integration window that was selected as part of a calibration procedure. In various embodiments, the generation of thresholds may be performed parallel to other operations of method 500, or as a separate and/or previously perform process. Accordingly, the generation of thresholds may be performed independently of other operations of method 500.

In one example, in a simulation, a cell routing resistance may be increased 2× times to simulate a micro-scratch. The measured mutual capacitance may be measured and it may, for example, decrease by 10% for an observed cell. Accordingly, a detection threshold of 10% of an expected panel mutual capacitance may be identified as a threshold value. Such threshold value determination operations may be suitable for sensing devices that have small (less than 5%) cell-to-cell mutual capacitance tolerances. For sensing devices that have larger manufacturing tolerances, one or more normalization operations may be performed, as was described above. Accordingly, threshold values may be identified using the normalized mutual capacitances ($N_{i,j}$), see Equation 1 for calculation method.

Method 500 may perform operation 514 during which it may be determined whether or not a determined difference is greater than a threshold for any sense location. Such a determination may be made based on a comparison of the difference values with the threshold values. In various embodiments, the comparison may be a cell-by-cell or entry-by-entry comparison where corresponding entries of the data tables are compared. If it is determined that a determined difference is greater than a threshold for a sense location, method 500 may proceed to operation 516.

Accordingly, during operation 516 the presence of a defect may be identified. Accordingly, if a difference value exceeds a determined threshold for a particular cell, a defect may be identified. Moreover, based on a location of the difference within the data table, a location of the defect may be identified based on a corresponding intersection of a row electrode and column electrode. As will be discussed in greater detail below, in response to identifying a defect, one or more mitigation operations may be performed to mitigate effects of the defect.

Returning to operation 514, if it is determined that no determined difference is greater than a threshold for any sense location, method 500 may proceed to operation 518 during which it may be determined that no defects are detected. If it is determined that no defects are detected, then normal operation of the sensing device may continue. It will be appreciated that subsequent iterations of method 500 may be performed periodically as part of maintenance/diagnostic operations, or may be performed dynamically and in response to an event or input triggering diagnostic operations.

Figure 6:
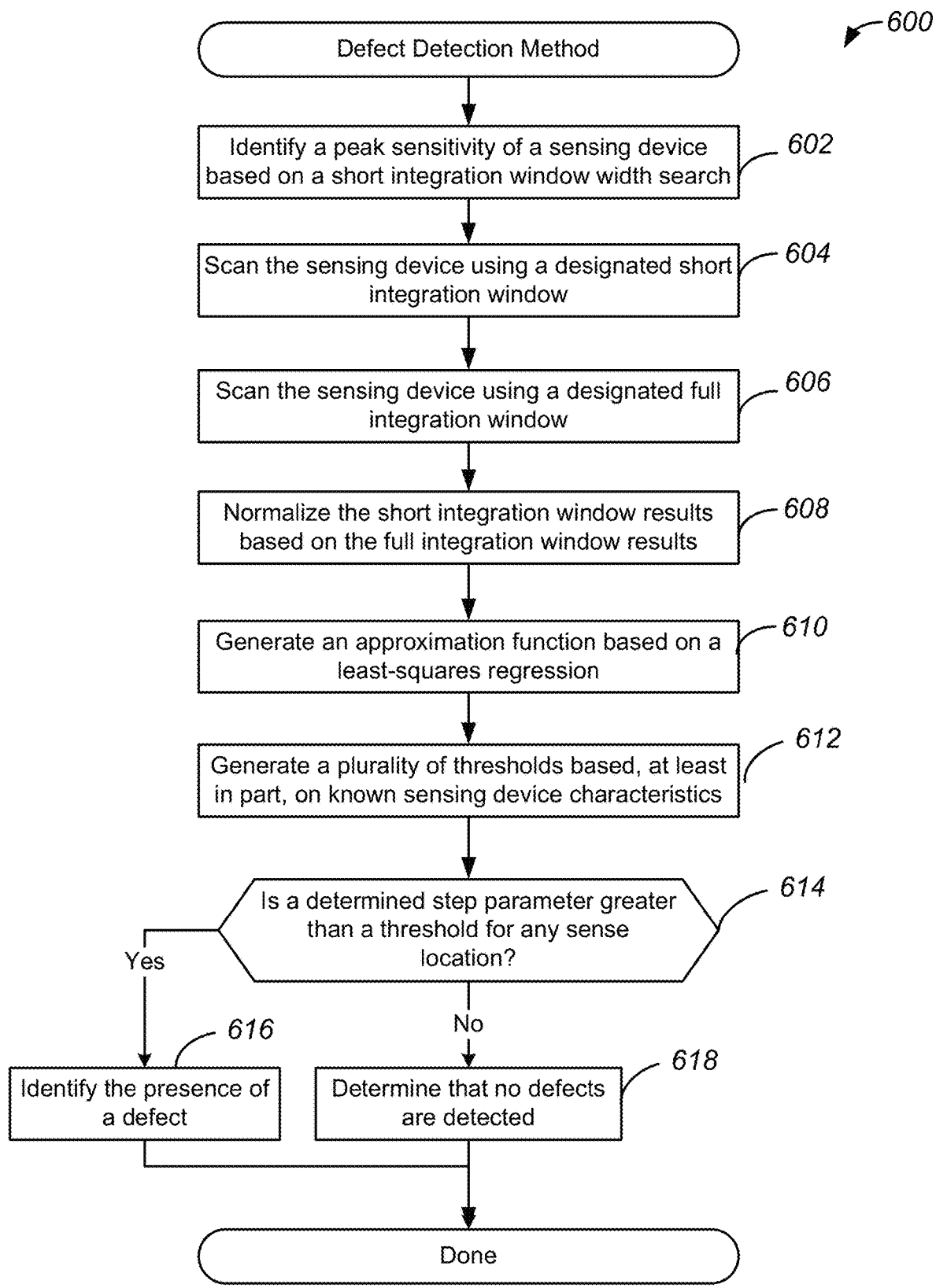
FIG. 6 illustrates an example of yet another method for defect detection, performed in accordance with some embodiments.

FIG. 6 illustrates an example of yet another method for defect detection, performed in accordance with some embodiments. As discussed above, a sensing device may include various electrodes configured to obtain one or more measurements for touch and/or hover detection. In various embodiments, a method, such as method 600, may be performed to identify defects in based, at least in part, on temporal responses of sensing locations and associated threshold values. As will be discussed in greater detail below, various different types of computations may be used to identify the defects.

Method 600 may perform operation 602 during which a peak sensitivity of a sensing device may be identified based on a short integration window width search. As similarly discussed above, the peak sensitivity may be identified based on an application of multiple different short integration window periods. Accordingly, operation 602 may be performed as part of a calibration operation, and test signals may be provided to and measured by electrodes included in the sensing device during calibration and initial configuration of a sensing device. Thus, during operation 602, sensitivity readings may be obtained for the sensing device based on the different short integration windows, and a short integration window may be identified that provides a peak or greatest sensitivity, as similarly discussed above with reference to operation 502 in FIG. 5.

Method 600 may perform operation 604 during which the sensing device may be scanned using the designated short integration window. Accordingly, scanning operations may be performed on the sensing device based on the short integration window, and measurements may be made and stored as measurement data. In various embodiments, the measurements include mutual capacitance measurements that measure a mutual capacitance between transmit and receive electrodes.

Method 600 may perform operation 606 during which the sensing device may be scanned using a designated full integration window. As similarly discussed above, a full integration window may be a designated period of time that is longer than a total time for accumulated charge in the sensing device to discharge. Accordingly, scanning operations may be performed on the sensing device based on the full integration window, and measurements, which may be mutual capacitance measurements and/or impedance measurements, may be made and stored as measurement data.

Method 600 may perform operation 608 during which the short integration window results may be normalized based on the full integration window results. Accordingly, as discussed above, additional variance in measurement values may be reduced. In various embodiments, operations 606 and 608 are performed optionally. For example, in some embodiments, method 600 does not include operations 606 and 608. Accordingly, in various embodiments, no full integration window measurements are taken, and no normalization operations are performed. The normalization procedure is similar to the normalization procedure 508, FIG. 5.

Method 600 may perform operation 610 during which an approximation function may be generated based, at least in part, on a least-squares regression. In various embodiments, the application of a least squares regression, also referred to herein as a least-squares fit, may be used to identify steps or transitions in the measurement data. For example, as similarly discussed above, measurements may have been stored in a table of data values, where each data value represents a measurement at an intersection between a row electrode and a column electrode in the sensing device. Accordingly, a one-dimensional least squares approximation function may be used to approximate mutual capacitance dependence for each electrode included in the sensing device. In this way, the least squares fit may be used to generate an approximated representation of sensing device behavior, and the approximated representation may include one or more transitions, such as steps, defined by step parameters.

In some embodiments, a least squares approximation technique calculates the sum of difference squares between an approximation function and experimental data. Accordingly, a fit approximation method (e.g. Levenberg-Marquardt algorithm) attempts to determine the coefficients of the approximation function that minimize a sum of difference squares. The approximation function is defined to have a step parameter. For example, the approximation function is a sum of a second order polynomial function and Heaviside step function with an index offset and step amplitude. The approximation function calculates the polynomial coefficients and Heaviside step function offset and step amplitude together during a least squares fit optimization operation. The polynomial function represents a natural mutual capacitance decay approaching the center of the sensing device. The defect is considered detected when the Heaviside step function amplitude is higher than the a threshold value, and the offset index identifies the defect location. An example of such mutual capacitance approximation function for a single dimension is shown below in equation 2:

$$y(x) = A \cdot (x - x_c)^2 + B \cdot (x - x_c) + C + D \cdot H(x - x_d) \quad (2)$$

As shown above in equation 2, A, B, and C may be coefficients that represent polynomial parts of the approximation function. In some embodiments, B can be zeroed for high-quality panels with fully symmetric mutual capacitance readings with respect to cell center $x_c$ location. Moreover, $x_c$ may be an index of a center of a sensing device. For example, if a sensing device has 25 electrodes, an index of center $x_c$ is 13. Furthermore, H(x) may be a Heaviside step function, D may be a step amplitude, and $x_d$ may be a defective electrode index. If the D coefficient is higher than a designated threshold value, a defect may be identified.

In some embodiments, the approximation function is generated based on multiple sets of measurement data from different scans, and may thus have a reduced variance. As will be discussed in greater detail below, the step parameters identified by the approximation function may be compared with threshold values to identify defects. It will be appreciated that a two-dimensional approximation function, or any other suitable approximation function, may also be used.

Method 600 may perform operation 612 during which a plurality of thresholds may be generated based, at least in part, on known panel characteristics. As similarly discussed above, known panel characteristics may be stored in a particular data structure configured to represent threshold values for each cell. Accordingly, during operation 612, a designated threshold mapping may be retrieved from memory. As also discussed above, the thresholds may be generated independent from and/or asynchronous to other operations of method 600.

Method 600 may perform operation 614 during which it may be determined whether or not a determined step parameter is greater than a threshold for any sense location. Such a determination may be made based on a comparison of the step parameters with the threshold values. In various embodiments, the comparison may be a cell-by-cell or entry-by-entry comparison where corresponding entries of the data tables are compared. If it is determined that a determined difference is greater than a threshold for a sense location, method 600 may proceed to operation 616.

Accordingly, during operation 616 the presence of a defect may be identified. Accordingly, if a step parameter value exceeds a determined threshold for a particular cell, a defect may be identified. Moreover, based on a location of the difference within the data table, a location of the defect may be identified based on a corresponding intersection of a row electrode and column electrode. As will be discussed in greater detail below, in response to identifying a defect, one or more mitigation operations may be performed to mitigate effects of the defect.

Returning to operation 614, if it is determined that no determined step parameter value is greater than a threshold for any sense location, method 600 may proceed to operation 618 during which it may be determined that no defects are detected. If it is determined that no defects are detected, then normal operation of the sensing device may continue. It will be appreciated that subsequent iterations of method 600 may be performed periodically as part of maintenance/diagnostic operations, or may be performed dynamically and in response to an event or input triggering diagnostic operations.

Figure 7:
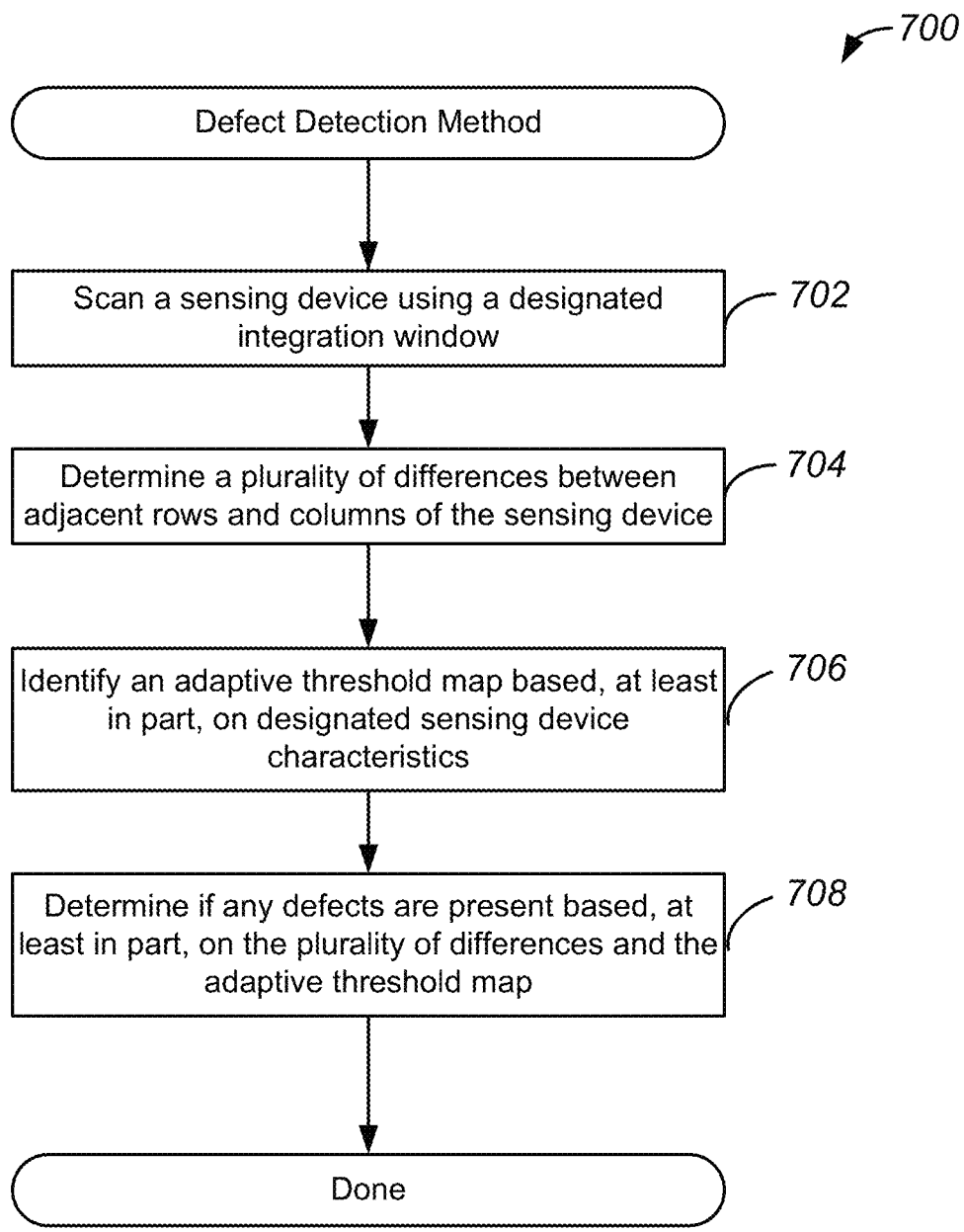
FIG. 7 illustrates an example of an additional method for defect detection, performed in accordance with some embodiments.

FIG. 7 illustrates an example of an additional method for defect detection, performed in accordance with some embodiments. As discussed above, a sensing device may include various electrodes configured to obtain one or more measurements for touch and/or hover detection. In various embodiments, a method, such as method 700, may be performed to identify defects in based, at least in part, on an adaptive threshold map. As will be discussed in greater detail below, the use of such an adaptive threshold map may account for non-uniformities in the sensing device.

Method 700 may perform operation 702 during which a sensing device may be scanned based on a designated integration window. As similarly discussed above, scanning operations may be performed on the sensing device based on an integration window have a designated duration and period of time, and measurements may be made and stored as measurement data. In various embodiments, the measurements include mutual capacitance measurements that measure a mutual capacitance between transmit and receive electrodes.

Method 700 may perform operation 704 during which a plurality of differences may be determined between adjacent rows and columns of the sensing device. As similarly discussed above, a plurality of difference values may be generated based on one or more computations. In one example, measurements may have been stored in a table of data values, where each data value represents a measurement at an intersection between a row electrode and a column electrode in the sensing device. Furthermore, differences may be computed based on difference computations. For example, a two-dimensional high pass filter (2D HPF) may be used to generate the difference values. In some embodiments, least squares computations may be performed, as similarly discussed above.

Method 700 may perform operation 706 during which an adaptive threshold map may be identified based, at least in part, on designated panel characteristics. In various embodiments, the adaptive threshold map is generated by an entity, such as a manufacturer. As will be discussed in greater detail below, the adaptive threshold map is configured to have varying thresholds based on one or more sensing device parameters. When adaptive thresholds are implemented in this way, false positives in defect detection may be reduced as the adaptive threshold map may be configured to compensate for non-uniformities of the sensing device. More specifically, thresholds may be varied and non-uniform based on known non-uniform performance characteristics of the sensing device. For example, threshold values in the adaptive threshold map may increase with proximity to edges of the sensing device and/or proximity to connectors of electrodes. As discussed above, the adaptive threshold map may be generated based on simulation data or other data obtained from testing during sensing device and/or construction.

Method 700 may perform operation 708 during which it may be determined if defects are present based, at least in part, on the plurality of differences and the adaptive threshold map. As similarly discussed above, such a determination may be made based on a comparison of the difference values with the adaptive threshold values. In various embodiments, the comparison may be a cell-by-cell or entry-by-entry comparison where corresponding entries of the data tables are compared. Accordingly, during operation 708, the difference values may be compared with the threshold values included in the threshold map, and defects may be identified based on whether not any of the difference values exceeds a corresponding threshold value.

Figure 8:
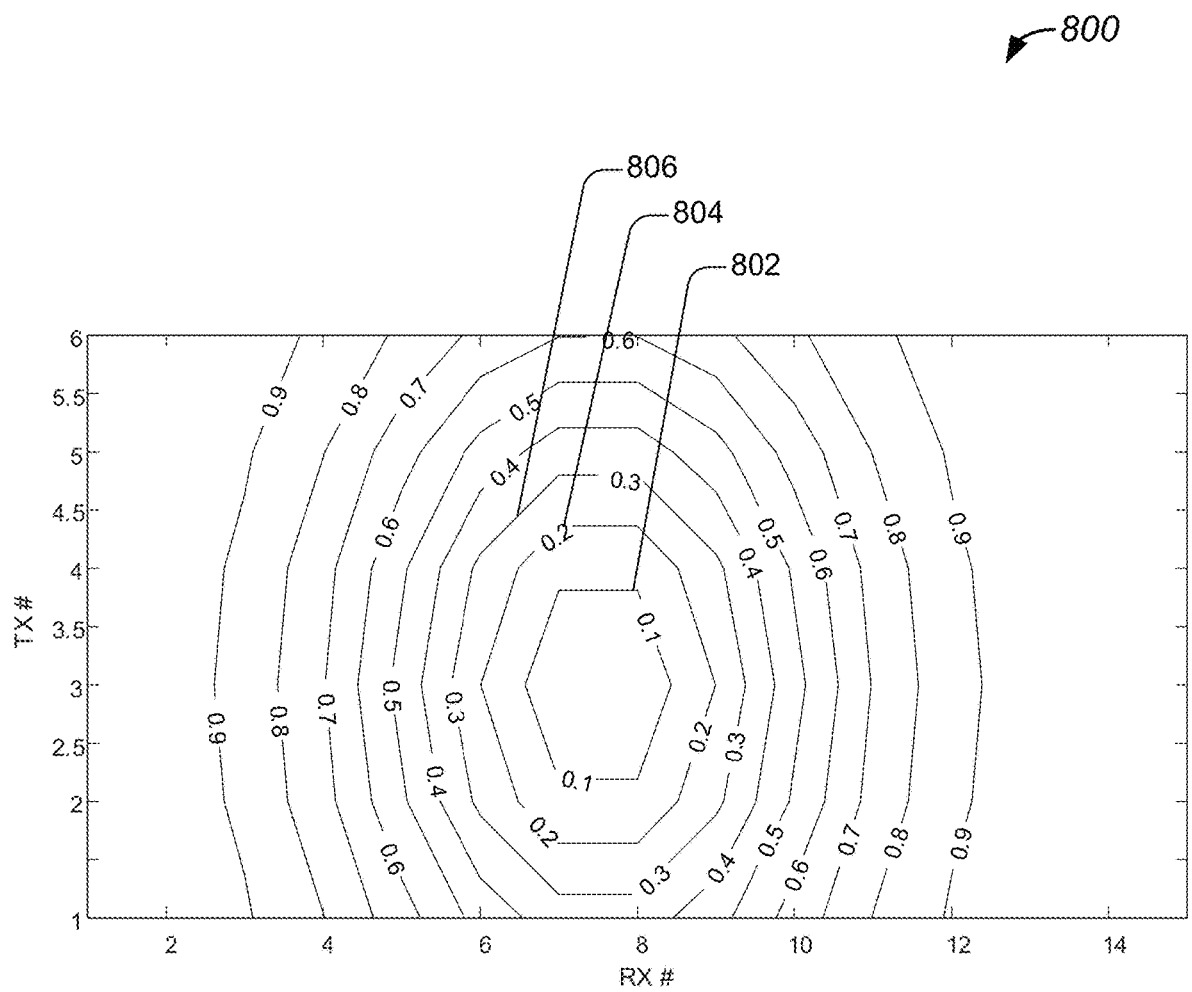
FIG. 8 illustrates a diagram of an example of an adaptive threshold map, configured in accordance with some embodiments.

FIG. 8 illustrates a diagram of an example of an adaptive threshold map, configured in accordance with some embodiments. As discussed above, the use of an adaptive threshold map may account for non-uniformities in the sensing device. Accordingly, threshold values included in the adaptive threshold map may vary in accordance with performance characteristics of the sensing device. As shown in FIG. 8, image 800 illustrates an example of varying thresholds that may be applied based on a distance from a center of a sensing device. For example, first adaptive threshold value 802 may be used for sense cells positioned a first distance range from the center of the sensing device. Moreover, second adaptive threshold value 804 may be used for a second distance range from the center of the sensing device. Furthermore, third adaptive threshold value 806 may be used for a third distance range from the center of the sensing device. In this way, an adaptive threshold map may be configured to map different threshold values to different sense locations of the sensing device.

Figure 9:
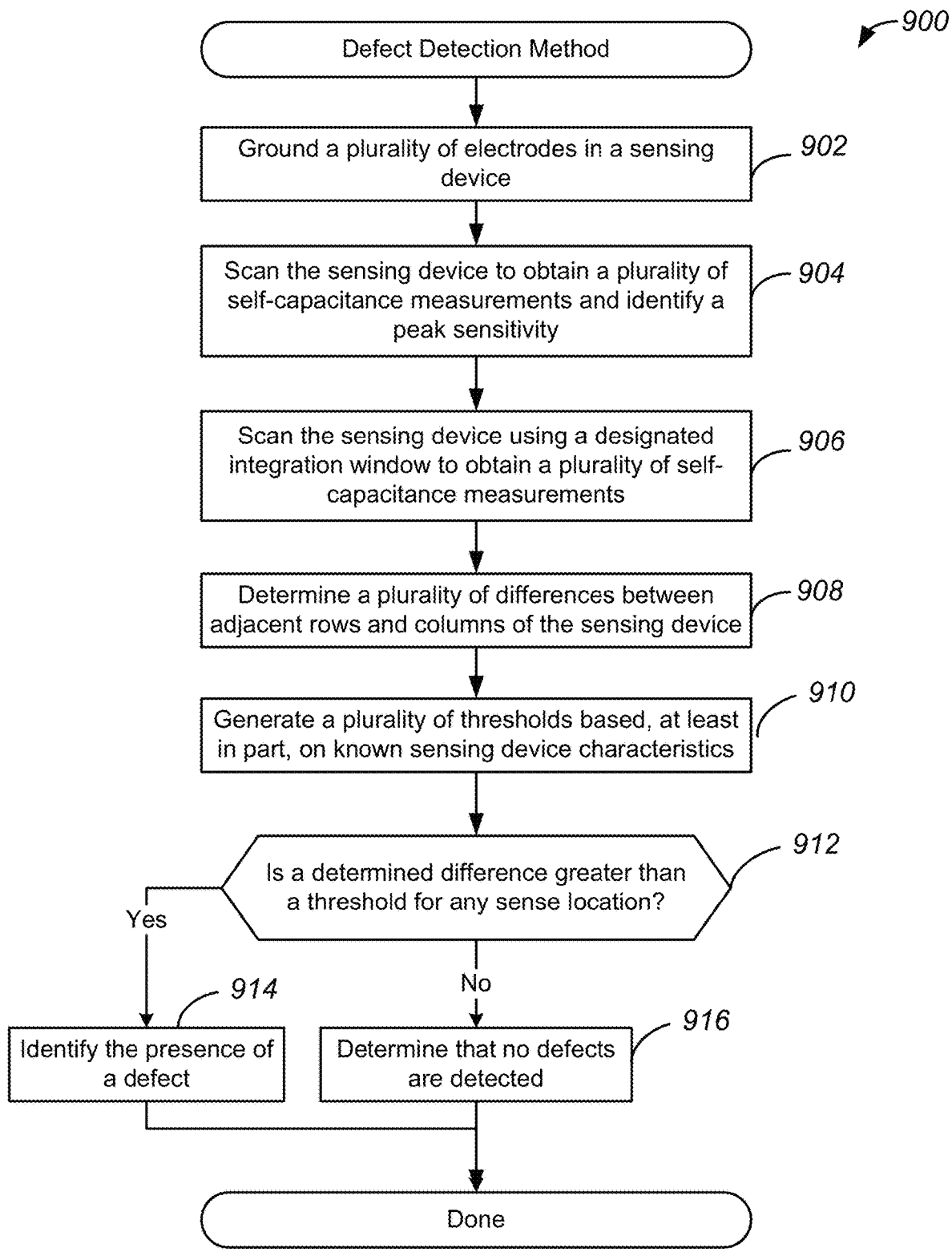
FIG. 9 illustrates an example of another method for defect detection, performed in accordance with some embodiments.

FIG. 9 illustrates an example of another method for defect detection, performed in accordance with some embodiments. As discussed above, a sensing device may include various electrodes configured to obtain one or more measurements for touch and/or hover detection. In various embodiments, a method, such as method 900, may be performed to identify defects in based, at least in part, on different types of capacitance measurements. As will be discussed in greater detail below, self-capacitance capacitance measurements may be used to identify the defects.

Method 900 may perform operation 902 during which a plurality of electrodes may be grounded. In various embodiments, the plurality of electrodes may be non-scanned electrodes. In one example, the plurality of electrodes may include one or more of the receive electrodes included in the sensing device. Accordingly, the receive electrodes included in the sensing device may be coupled to a circuit ground. As will be discussed in greater detail below, the grounding of electrodes may be performed to facilitate the obtaining of self-capacitance measurements.

Method 900 may perform operation 904 during which a sensing device may be scanned, and a peak sensitivity of a sensing device may be identified. As similarly discussed above, the peak sensitivity may be identified based on an application of multiple different short integration window periods. Accordingly, operation 904 may be performed as part of a calibration operation, and test signals may be provided to and measured by electrodes included in the sensing device during calibration and initial configuration of a sensing device. Thus, during operation 904, sensitivity readings may be obtained using self-capacitance measurements and based on the different short integration windows, and a short integration window may be identified that provides a peak or greatest sensitivity.

Method 900 may perform operation 906 during which the sensing device may be scanned using a designated integration window. As similarly discussed above, a designated integration window may be a designated period of time during which accumulated charge in the sensing device discharges. Accordingly, scanning operations may be performed on the sensing device based on the integration window, and measurements, which may be self-capacitance measurements, may be made and stored as measurement data.

Method 900 may perform operation 908 during which a plurality of differences between adjacent rows and columns of the sensing device may be determined. As similarly discussed above, a plurality of difference values may be generated based on one or more computations. Furthermore, differences may be computed based on difference computations.

Method 900 may perform operation 910 during which a plurality of thresholds may be generated based, at least in part, on known panel characteristics. As similarly discussed above, known panel characteristics may be stored in a particular data structure configured to represent threshold values for each cell. Accordingly, during operation 910, a designated threshold mapping may be retrieved from memory. As also discussed above, the thresholds may be generated independent from and/or asynchronous to other operations of method 900.

Method 900 may perform operation 912 during which it may be determined whether or not a determined difference is greater than a threshold for any sense location. Such a determination may be made based on a comparison of the difference values with the threshold values. In various embodiments, the comparison may be a row-by-row or column-by-column comparison where corresponding entries of the data tables are compared. If it is determined that a determined difference is greater than a threshold for a sense location, method 900 may proceed to operation 914.

Accordingly, during operation 914 the presence of a defect may be identified. Accordingly, if a difference value exceeds a determined threshold for a particular cell, a defect may be identified. As will be discussed in greater detail below, in response to identifying a defect, one or more mitigation operations may be performed to mitigate effects of the defect.

Returning to operation 912, if it is determined that no determined difference is greater than a threshold for any sense location, method 900 may proceed to operation 916 during which it may be determined that no defects are detected. If it is determined that no defects are detected, then normal operation of the sensing device may continue. It will be appreciated that subsequent iterations of method 900 may be performed periodically as part of maintenance/diagnostic operations, or may be performed dynamically and in response to an event or input triggering diagnostic operations.

Figure 10:
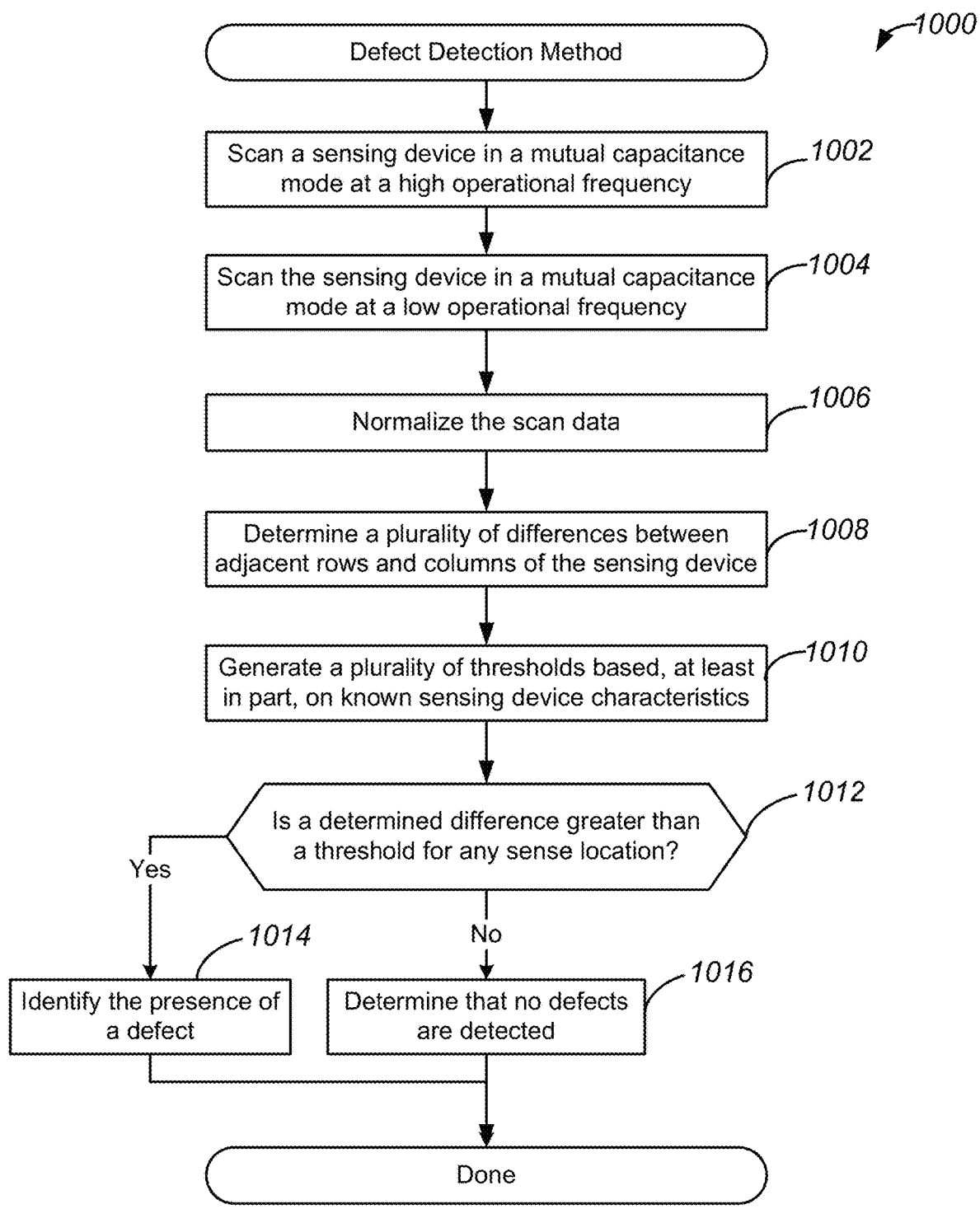
FIG. 10 illustrates an example of an additional method for defect detection, performed in accordance with some embodiments.

FIG. 10 illustrates an example of an additional method for defect detection, performed in accordance with some embodiments. As discussed above, a sensing device may include various electrodes configured to obtain one or more measurements for touch and/or hover detection. In various embodiments, a method, such as method 1000, may be performed to identify defects in based, at least in part, on temporal responses of sensing locations and associated threshold values. As will be discussed in greater detail below, different scanning frequencies may be used to identify the defects.

Method 1000 may perform operation 1002 during which a sensing device may be scanned at a high operational frequency. Accordingly, during operation 1002 the sensing device may be scanned at a first frequency, and a first plurality of measurements may be obtained. In various embodiments, the first frequency is a higher frequency of operation that may be used for particular sensing operations or sensing modes. In various embodiments, performance properties may vary based on operational frequency due to frequency-dependent properties of the sensing device. In one example, in a high frequency of operation, a transient process is not complete as a sensing device has not recharged completely. The sensing device is recharged completely (settled) during a second scan with lower frequency of operation. In one example, the first frequency is 300 kHz and the second frequency is 100 kHz.

Method 1000 may perform operation 1004 during which the sensing device may be scanned at a low operational frequency. Accordingly, during operation 1004 the sensing device may be scanned at a second frequency, and a second plurality of measurements may be obtained. In various embodiments, the second frequency is a normal frequency of operation that may be used during normal operation of the sensing device. Moreover, the second frequency may be lower than the first frequency. As discussed above, performance properties of the sensing device may be different at the second frequency than the first frequency due to frequency-dependent properties of the sensing device.

Method 1000 may perform operation 1006 during which the scan data may be normalized. Accordingly, as similarly discussed above, additional variance in measurement values may be reduced via one or more normalization operations. More specifically, measurement data obtained during at the high operational frequency may be normalized based on the measurement data obtained at the low operational frequency. In various embodiments, operations 1004 and 1006 are performed optionally. For example, in some embodiments, method 1000 does not include operations 1004 and 1006. In various embodiments, the high-frequency scan results can be normalized based on the low-frequency scan results. For example, for each panel intersection, a new matrix of coefficients can be calculated based on a relation of scan results at the high frequency of operation to scan results at the low frequency of operation. Accordingly, in various embodiments, low operational frequency measurements are not taken, and no normalization operations are performed.

Method 1000 may perform operation 1008 during which a plurality of differences between adjacent rows and columns of the sensing device may be determined. As similarly discussed above, a plurality of difference values may be generated based on one or more computations. In one example, measurements may have been stored in a table of data values, where each data value represents a measurement at an intersection between a row electrode and a column electrode in the sensing device. Furthermore, differences may be computed based on difference computations. For example, a two-dimensional high pass filter may be used to generate the difference values. In some embodiments, least squares computations may be performed, as similarly discussed above.

Method 1000 may perform operation 1010 during which a plurality of thresholds may be generated based, at least in part, on known panel characteristics. As similarly discussed above, known panel characteristics may be stored in a particular data structure configured to represent threshold values for each cell. Accordingly, during operation 1010, a designated threshold mapping may be retrieved from memory. As also discussed above, the thresholds may be generated independent from and/or asynchronous to other operations of method 1000.

Method 1000 may perform operation 1012 during which it may be determined whether or not a determined difference is greater than a threshold for any sense location. Such a determination may be made based on a comparison of the difference values with the threshold values. In various embodiments, the comparison may be a cell-by-cell (cross-section by cross-section) or entry-by-entry comparison where corresponding entries of the data tables are compared. If it is determined that a determined difference is greater than a threshold for a sense location, method 1000 may proceed to operation 1014.

Accordingly, during operation 1014 the presence of a defect may be identified. Accordingly, if a difference value exceeds a determined threshold for a particular cell, a defect may be identified. Moreover, based on a location of the difference within the data table, a location of the defect may be identified based on a corresponding intersection of a row electrode and column electrode. As will be discussed in greater detail below, in response to identifying a defect, one or more mitigation operations may be performed to mitigate effects of the defect.

Returning to operation 1012, if it is determined that no determined difference is greater than a threshold for any sense location, method 1000 may proceed to operation 1016 during which it may be determined that no defects are detected. If it is determined that no defects are detected, then normal operation of the sensing device may continue. It will be appreciated that subsequent iterations of method 1000 may be performed periodically as part of maintenance/diagnostic operations, or may be performed dynamically and in response to an event or input triggering diagnostic operations.

Figure 11:
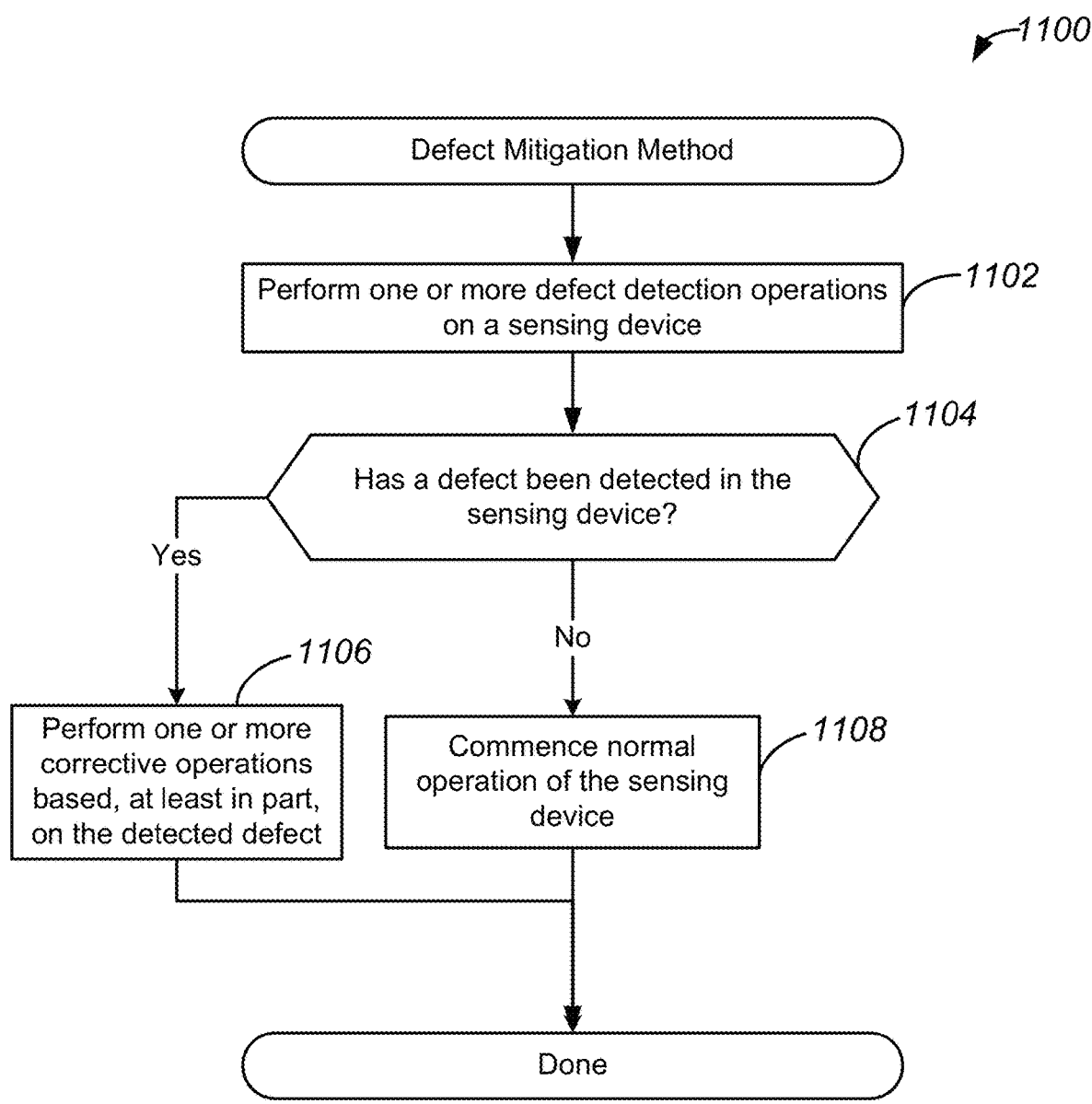
FIG. 11 illustrates an example of a method for defect mitigation, performed in accordance with some embodiments.

FIG. 11 illustrates an example of a method for defect mitigation, performed in accordance with some embodiments. As discussed above, a sensing device may include various electrodes configured to obtain one or more measurements for touch and/or hover detection. In various embodiments, a method, such as method 1000, may be performed to identify defects in based, at least in part, on temporal responses of sensing locations and associated threshold values. As will be discussed in greater detail below, different scanning frequencies may be used to identify the defects.

Method 1100 may perform operation 1102 during which one or more defect detection operations may be performed. As discussed above, the defect detection operations may include scanning a sensing device to obtain multiple measurements as well as performing one or more computations, such as the determination of difference values. In various embodiments, the defect detection operations may also include the determination of one or more threshold values for the sensing device.

Method 1100 may perform operation 1104 during which it may be determined if a defect has been detected. Accordingly, as discussed above, measurement data may be compared with threshold values to identify the presence of one or more defects. For example, difference values may be compared with threshold values to determine if a difference value exceeds a threshold value for any sense cell. If it is determined that a defect has been detected, method 1100 may proceed to operation 1106.

Accordingly, during operation 1106, one or more corrective operations may be performed based, at least in part, on the detected defect. In various embodiments, the corrective operations may be selected and configured to reduce an impact of the detected defect on efficacy of the sensing device. For example, in response to identifying a defect, scanning operations may skip scanning of the damaged electrode. Thus, false positives that would otherwise be detected by the panel may be avoided. In another example, an operational frequency of the sensing device may be reduced. Moreover, performance of the defective sensor may be normalized with the surrounding system. Other corrective operations may include scanning a defective electrode longer, using a higher transmit signal, and/or applying a gain value to a receive signal. Accordingly, increases in transmit signals and/or receive gains may be implemented localized to the defective sensor. In another example, scanning frequencies may be reduced, or particular scanning operations identified as critical or high priority may be moved away from the location of the defect. In some embodiments, a user may be provided with an option to select a corrective operation. Accordingly, a user may identify which corrective operation should be performed during, for example, a configuration operation.

In various embodiments, the corrective operations may also include the generation of a notification or message. Accordingly, a notification may be generated and sent to another system component or another system to indicated that a defect has been detected. For example, the notification may be a message indicating repair is recommended, or may include a flag indicating that the panel should be replaced during a next repair service. Moreover, such notification messages may also include instructions to complete repairs.

In this way, operational impacts of the defect may be mitigated and reduced, thus enabling the sensing device to be used longer, and delaying a time at which the sensing device fails and must be replaced. As discussed above, sensing devices may be included in systems, such as automobiles and security control panels, and thus may be integrated with system components that make the replacement of such sensing devices expensive and impractical. Embodiments disclosed herein prolong the functionality of such sensing devices thus improving the lifetime of such systems. Moreover, embodiments disclosed herein improve the safety of operation of such systems by prolonging safe operation of such sensing devices. More specifically, touch panels configured as disclosed herein may be integrated in contexts such as automobiles to prolong the safe operation of such touch panels and ensure that safe operation and control of components of the automobile may be maintained despite the presence of a defect or failure of a portion of the touch panel.

Returning to operation 1104, if it is determined that no defect is present, method 1100 may perform operation 1108 during which normal operation of the sensing device may be performed. Accordingly, ordinary scanning frequencies may be used for scanning operations, and normal operation of the sensing device may continue. It will be appreciated that additional iterations of method 1100 may be performed periodically or dynamically. For example, additional iterations of defect detection operations may be performed after the passing of a designated period of time. In another example, additional iterations of defect detection operations may be performed in response to the occurrence of a particular event, such as a message or notification from another system component, or a detection of one or more patterns of activity.

Figure 12:
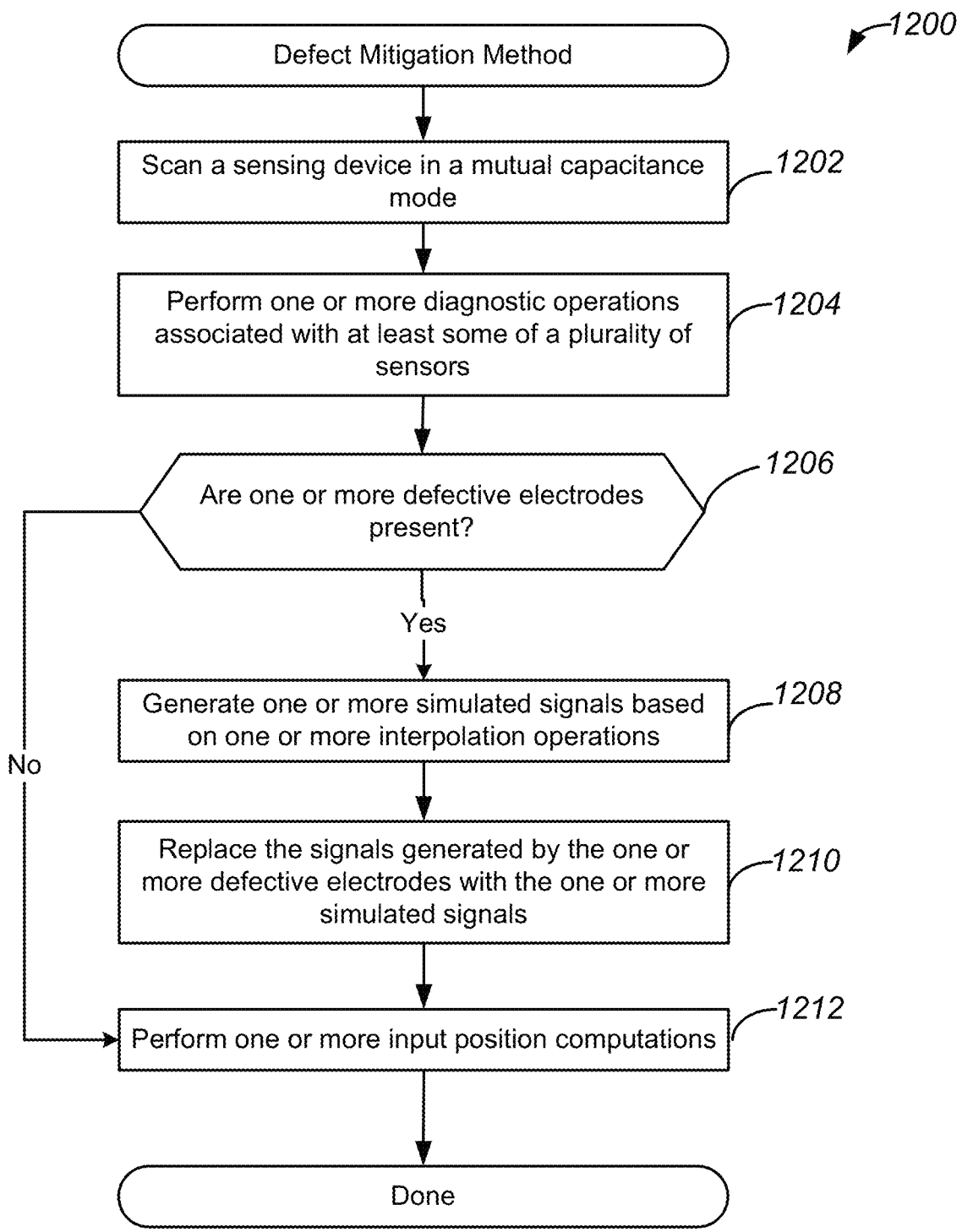
FIG. 12 illustrates an example of another method for defect mitigation, performed in accordance with some embodiments.

FIG. 12 illustrates an example of another method for defect mitigation, performed in accordance with some embodiments. As similarly discussed above, a sensing device may include various electrodes configured to obtain one or more measurements for touch and/or hover detection. In various embodiments, a method, such as method 1200, may be performed to identify defects in the sensing device or an associated sensor, and perform one or more signal generation operations to compensate for an identified defective electrode.

Method 1200 may perform operation 1202 during which a sensing device may be scanned in a mutual capacitance mode. As similarly discussed above, one or more scanning operations may be performed to obtain a plurality of mutual capacitance measurements using electrodes included in the sensing device. As also discussed above, such mutual capacitance measurements may be stored as measurement data.

Method 1200 may perform operation 1204 during which one or more diagnostic operations associated with at least some of a plurality of sensors may be performed. Thus, in some embodiments, the sensing device may be included in one or more sensors, such as a touch sensor. During operation 1204, one or more diagnostic operations may be performed to determine if the sensor is working properly, or if a problem with the operation of the sensor has been detected.

Method 1200 may perform operation 1206 during which it may be determined if any defective electrodes are present. Accordingly, during operation 1206, one or more of the above described defect detection techniques may be performed to determine if any defective electrodes are present in the sensing device.

If it is determined that defective electrodes are present, method 1200 may perform operation 1208 during which one or more simulated signals may be generated based on one or more interpolation operations. In various embodiments, the simulated signals may be generated based on electrodes adjacent to an identified defective electrode. Accordingly, adjacent electrodes may be used to approximate or simulate a signal that would be generated by the defective electrode if it was working properly. In some embodiments, the simulated signal is generated based on one or more interpolation operations. In various embodiments, one or more linear interpolation techniques may be used to generate a signal for a damaged i-column by taking the mean of the signals from the adjacent i−1, i+1 column using an equation, such as equation 3 shown below.

$$C_{i,j} = \tfrac{1}{2}(C_{i-1,j} + C_{i+1,j}) \quad (3)$$

In various embodiments, if the damaged i-column is located on the edge of the sensing device (e.g. a column with the largest or smallest possible index number), signals for the damaged column can be determined based on a linear extrapolation technique using the mutual capacitance values from adjacent columns to the i-column, such as columns i−1 and i−2 as shown by Equation 4:

$$C_{i,j} = 2 \cdot C_{i-1,j} - C_{i-2,j} \quad (4)$$

Such calculations may be performed for all rows by sweeping index j in Equations 3 and 4. In various embodiments, similar interpolation or extrapolation techniques can be performed if the defect is located on a sensing device row electrode. Accordingly, linear interpolation techniques may be used to determine substitution signals for damaged row lines.

Method 1200 may perform operation 1210 during which signals generated by the one or more defective electrodes may be replaced with the one or more simulated signals. Accordingly, the simulated signals may be used to generate an approximated measurement data set, and the approximated measurement data may be included in the measurement data instead of the output of the defective electrode.

Method 1200 may perform operation 1212 during which one or more input position computations may be performed. Accordingly, the measurement data, that may include the approximated measurement data, may be used to determine if an input, such as a touch or a hover, is present at the sensing device. Such a determination may be made based on a comparison of measurement data to predetermined thresholds, or any suitable touch detection computation.

Figure 13A:
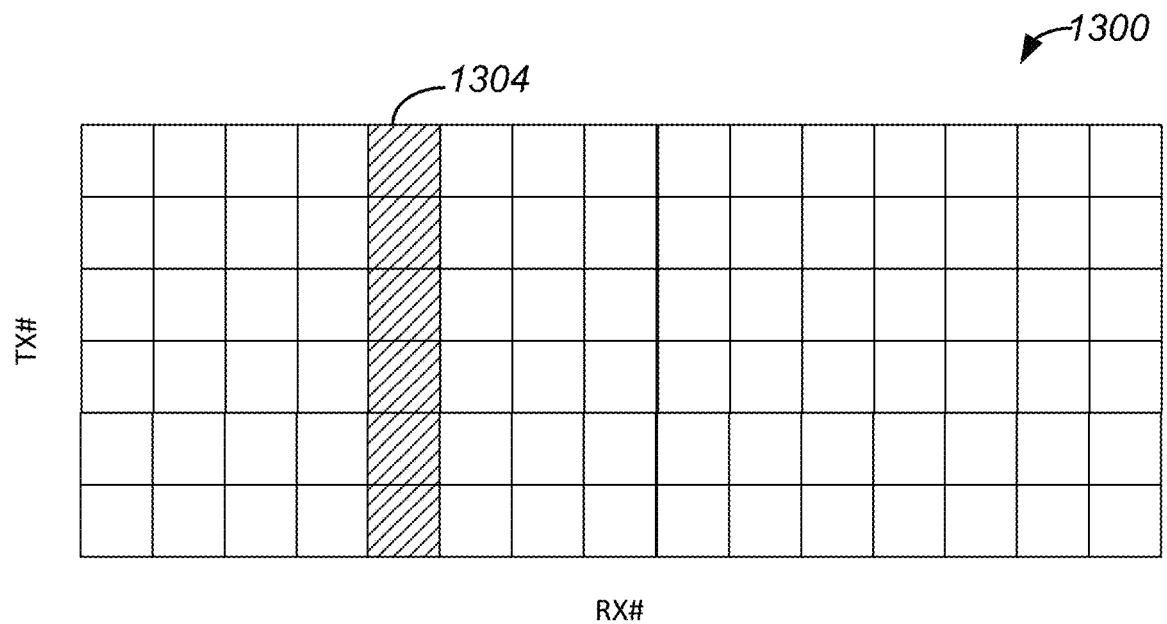
FIG. 13A illustrates an example of a sensing device, configured in accordance with some embodiments.

FIG. 13A illustrates an example of a sensing device, configured in accordance with some embodiments. As shown in FIG. 13A, a sensing device, such as sensing device 1300, may have one or more rows and columns of electrodes having intersections used for measurements. In some embodiments, one or more of the electrodes may be defective. For example, electrode 1304 might be defective and might not function properly. More specifically, electrode 1304 might have been damaged and might not be able to accurately obtain capacitance measurements.

Figure 13B:
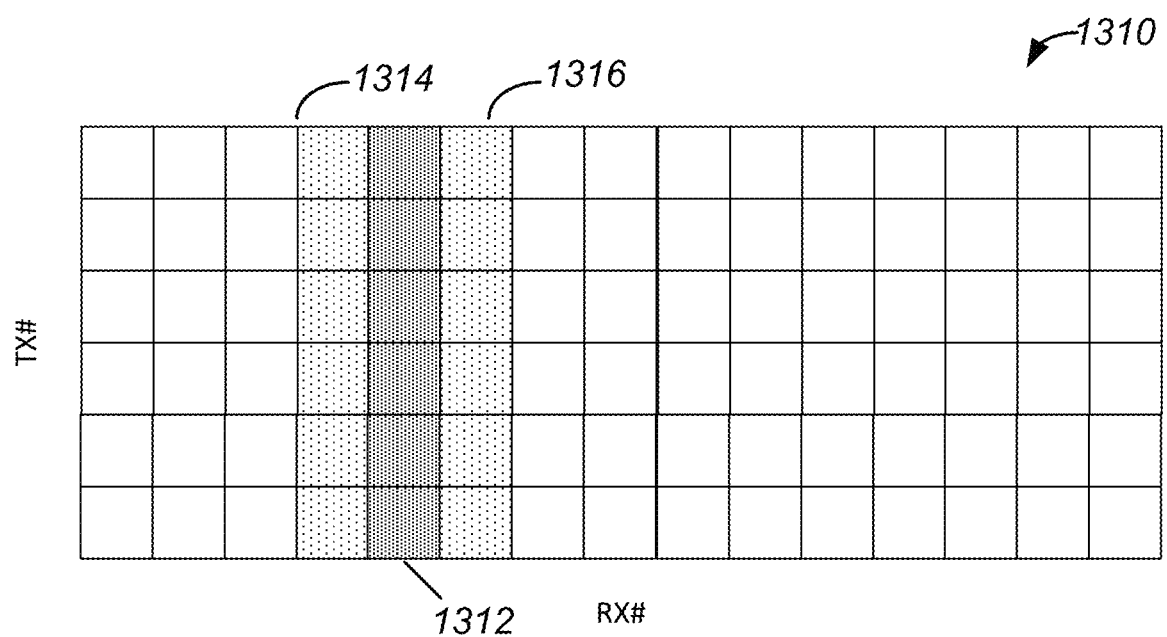
FIG. 13B illustrates an example of another sensing device, configured in accordance with some embodiments.

FIG. 13B illustrates an example of another sensing device, configured in accordance with some embodiments. As shown in FIG. 13B, a sensing device, such as sensing device 1310, may have one or more defective electrodes, such as electrode 1312. In various embodiments adjacent electrodes, such as electrode 1314 and electrode 1316, may be used to generate a signal to approximate an output of electrode 1312. Accordingly, interpolation operations may be performed on measurements associated with electrodes 1314 and 1316 to generate simulated signals, as discussed above.

Figure 14:
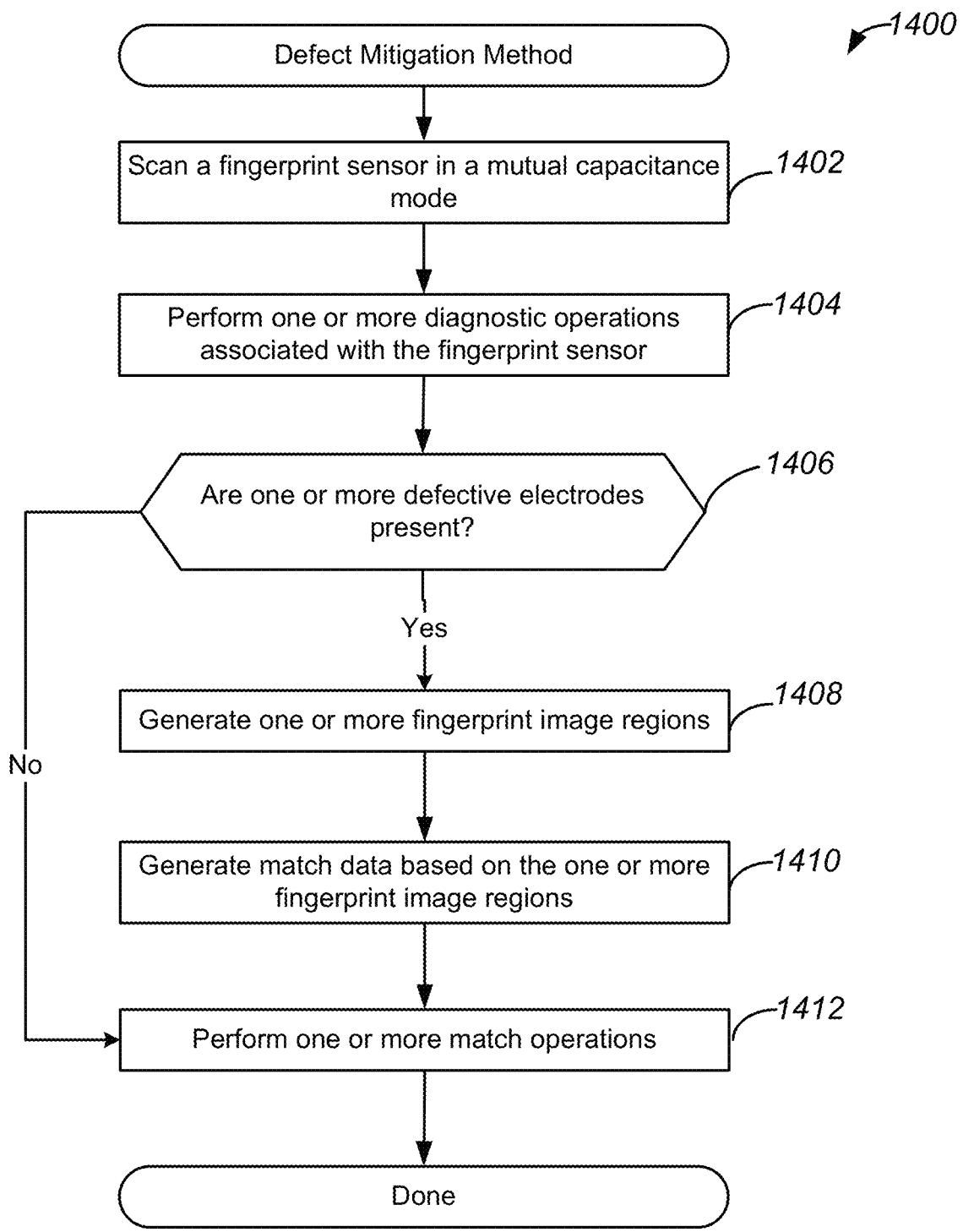
FIG. 14 illustrates an example of an additional method for defect mitigation, performed in accordance with some embodiments.

FIG. 14 illustrates an example of an additional method for defect mitigation, performed in accordance with some embodiments. As similarly discussed above, a sensing device may include various electrodes configured to obtain one or more measurements for touch and/or hover detection. In various embodiments, a method, such as method 1400, may be performed to identify defects in the sensing device or an associated fingerprint sensor, and perform one or more matching operations to compensate for an identified defective electrode.

Method 1400 may perform operation 1402 during which a fingerprint sensor may be scanned in a mutual capacitance mode. As similarly discussed above, one or more scanning operations may be performed to obtain a plurality of mutual capacitance measurements using electrodes included in a sensing device that may be included in a fingerprint sensor.

Method 1400 may perform operation 1404 during which one or more diagnostic operations associated with the fingerprint sensor may be performed. Thus, in some embodiments, the sensing device may be included in a fingerprint sensor. During operation 1404, one or more diagnostic operations may be performed to determine if the fingerprint sensor is working properly, or if a problem has been detected.

Method 1400 may perform operation 1406 during which it may be determined if any defective electrodes are present. Accordingly, during operation 1406, one or more of the above described defect detection techniques may be performed to determine if any defective electrodes are present in the sensing device.

If it is determined that defective electrodes are present, method 1400 may perform operation 1408 during which one or more fingerprint image regions may be generated.

Accordingly, the sensing device may be divided into one or more regions based on the identified effective electrode. For example, first and second regions may be identified on either side of the defective electrode, and the defective electrode may be excluded. Additional details are discussed in greater detail below with reference to FIGS. 15A and 15B.

Method 1400 may perform operation 1410 during which match data may be generated based on the one or more fingerprint image regions. Accordingly, measurement data may be generated for each of the identified fingerprint regions, and the data may be stored as match data.

Method 1400 may perform operation 1412 during which one or more match operations may be performed. Accordingly, the match data may be compared with reference data on a region by region basis to determine if a fingerprint match has occurred. In this way, the measurements associated with the generated fingerprint regions may be compared with corresponding regions of reference data to determine if a match has occurred, and the effects of the defective electrode on such matching operations may be mitigated.

FIG. 15A illustrates an example of a sensing device, configured in accordance with some embodiments. As shown in FIG. 15A, sensing device 1502 has various electrodes, such as electrode 1504. When electrode 1504 is functioning properly, a single fingerprint image region may be identified, such as fingerprint image region 1506. As shown in FIG. 15B, when an electrode is not functioning properly, the electrode may be excluded, and only electrodes such as group of electrodes 1508 and 1510 may be used. Accordingly, when electrode 1504 is not functioning properly, multiple fingerprint image regions may be identified, such as fingerprint image regions 1512 and 1514.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   scanning, using a designated integration window, a plurality of electrodes of a sensing device to obtain a plurality of measurements;
   determining a plurality of variance values for the plurality of electrodes based on the plurality of measurements and based on a distance computation associated with adjacent sense locations, the plurality of variance values identifying variances in the plurality of measurements between the adjacent sense locations of the sensing device;
   determining if a defect is present in the sensing device based, at least in part, on a comparison of the plurality of variance values with the plurality of threshold values; and
   performing one or more corrective operations in response to determining a defect is present.

2. The method of claim 1, wherein the one or more corrective operations comprises: generating a notification identifying the defect.

3. The method of claim 1, wherein the one or more corrective operations comprises: modifying an operational frequency of the sensing device.

4. The method of claim 1, wherein the sensing device is a capacitive sensing device comprising a plurality of first electrodes and a plurality of second electrodes, wherein the plurality of first electrodes and the plurality of second electrodes are orthogonal to each other, and wherein each of the plurality of sense locations is an intersection between one of the plurality of first electrodes and one of the plurality of second electrodes.

5. The method of claim 4, wherein the determining of the plurality of variance values comprises:
   determining a plurality of difference values for the plurality of electrodes based on the plurality of measurements, the plurality of difference values identifying differences in the plurality of measurements between adjacent sense locations of the sensing device; and
   identifying a plurality of threshold values for the sense locations of the sensing device, the plurality of threshold values identifying a designated threshold value for each sense location.

6. The method of claim 5, wherein the plurality of difference values is determined based, at least in part, on the distance computation associated with distances between sense locations, and wherein the distance computation is a two-dimensional high pass filter computation.

7. The method of claim 5, wherein at least one of the plurality of difference values is determined based, at least in part, on a least-squares regression.

8. The method of claim 5, wherein the plurality of threshold values is identified based on a plurality of designated panel characteristics.

9. A device comprising:
   one or more processors configured to:
      receive measurements obtained from a plurality of first electrodes and a plurality of second electrodes using a designated integration window, wherein the plurality of first electrodes and the plurality of second electrodes are orthogonal to each other;
      determine a plurality of variance values based on the plurality of measurements and based on a distance computation associated with adjacent sense locations, the plurality of variances values identifying variances in the plurality of measurements between the adjacent sense locations defined by the plurality of first electrodes and the plurality of second electrodes;
      determine if a defect is present based, at least in part, on a comparison of the plurality of variance values with the plurality of threshold values; and
      perform one or more corrective operations in response to determining a defect is present.

10. The device of claim 9, wherein the one or more processors are further configured to:
    determine a plurality of difference values for the plurality of electrodes based on the plurality of measurements, the plurality of difference values identifying differences in the plurality of measurements between adjacent sense locations of the sensing device; and
    identify a plurality of threshold values for the sense locations of the sensing device, the plurality of threshold values identifying a designated threshold value for each sense location, wherein the plurality of difference values is determined based, at least in part, on the distance computation associated with distances between sense locations.

11. The device of claim 9, wherein at least one of the plurality of difference values is determined based, at least in part, on a least-squares regression.

12. The device of claim 9, wherein the one or more corrective operations comprises: generating a notification identifying the defect.

13. The device of claim 9, wherein the one or more corrective operations comprises: modifying an operational frequency of a sensing device.

14. A system comprising:
a plurality of first electrodes;
a plurality of second electrodes, wherein the plurality of first electrodes and the plurality of second electrodes are orthogonal to each other, wherein intersections between the plurality of first electrodes and the plurality of second electrodes form a plurality of sense locations; and
a processing device configured to:
receive measurements obtained from the plurality of first electrodes and the plurality of second electrodes using a designated integration window;
determine a plurality of variance values based on the plurality of measurements and based on a distance computation associated with adjacent sense locations, the plurality of variance values identifying variance in measurements between the adjacent sense locations defined by the plurality of first electrodes and the plurality of second electrodes;
determine if a defect is present based, at least in part, on a comparison of the plurality of variance values with the plurality of threshold values; and
generate a notification identifying the defect in response to determining the defect is present.

15. The system of claim 14, wherein the processing device is further configured to:
determine a plurality of difference values for the plurality of electrodes based on the plurality of measurements, the plurality of difference values identifying differences in the plurality of measurements between adjacent sense locations of the sensing device; and
identify a plurality of threshold values for the sense locations of the sensing device, the plurality of threshold values identifying a designated threshold value for each sense location, wherein the plurality of difference values is determined based, at least in part, on the distance computation associated with distances between sense locations.

16. The system of claim 14, wherein at least one of the plurality of difference values is determined based, at least in part, on a least-squares regression.

17. The system of claim 14, wherein the processing device is further configured to: modify an operational frequency of a sensing device in response to determining the defect is present.

* * * * *